United States Patent
Asgedom et al.

(10) Patent No.: US 11,709,288 B2
(45) Date of Patent: *Jul. 25, 2023

(54) SEISMIC IMAGING WITH SOURCE DECONVOLUTION FOR MARINE VIBRATORS WITH RANDOM SOURCE SIGNATURES

(71) Applicant: PGS GEOPHYSICAL AS, Oslo (NO)

(72) Inventors: Endrias G. Asgedom, Oslo (NO); Okwudili Orji, Drammen (NO); Walter Söllner, Oslo (NO)

(73) Assignee: PGS Geophysical AS, Oslo (NO)

( * ) Notice: Subject to any disclaimer, the term of this patent is extended or adjusted under 35 U.S.C. 154(b) by 333 days.

This patent is subject to a terminal disclaimer.

(21) Appl. No.: 16/996,050

(22) Filed: Aug. 18, 2020

(65) Prior Publication Data

US 2021/0063593 A1 Mar. 4, 2021

Related U.S. Application Data

(60) Provisional application No. 62/892,984, filed on Aug. 28, 2019.

(51) Int. Cl.
*G01V 1/32* (2006.01)
*G01V 1/30* (2006.01)
(Continued)

(52) U.S. Cl.
CPC ............. *G01V 1/306* (2013.01); *G01V 1/325* (2013.01); *G01V 1/345* (2013.01); *G01V 1/3808* (2013.01);
(Continued)

(58) Field of Classification Search
CPC ........ G01V 1/306; G01V 1/325; G01V 1/345; G01V 1/3808; G01V 2210/3246; G01V 2210/44; G01V 2210/45
See application file for complete search history.

(56) References Cited

U.S. PATENT DOCUMENTS 7,298,672 B1 * 11/2007 Tenghamn ............. G01V 1/201
367/176
8,797,036 B2 * 8/2014 Kennedy ................ G01V 3/083
324/365

(Continued)

OTHER PUBLICATIONS

Fokkema, J.T. et al., "Seismic Applications of Acoustic Reciprocity," Elsevier Science Publishers B.V., 1993, pp. 104-114.

(Continued)

*Primary Examiner* — Elias Desta

(57) ABSTRACT

Processes and systems described herein are directed to imaging a subterranean formation from seismic data recorded in a marine survey with moving marine vibrators. The marine vibrators generate random sweeps with random sweep signatures. Processes and systems generate an up-going pressure wavefield from measured pressure and vertical velocity wavefield data recorded in the marine survey and obtain a downgoing vertical acceleration wavefield that records source wavefields, directivity, source ghosts, and random signatures of the random sweeps. The downgoing vertical acceleration wavefield data is deconvolved from the up-going pressure wavefield to obtain a subsurface reflectivity wavefield that is used to generate an image of the subterranean formation with reduced contamination from source wavefields, directivity, source ghosts, and random signatures of the random sweeps.

17 Claims, 24 Drawing Sheets

(51) Int. Cl.
*G01V 1/38* (2006.01)
*G01V 1/34* (2006.01)

(52) U.S. Cl.
CPC .. *G01V 2210/3246* (2013.01); *G01V 2210/44* (2013.01); *G01V 2210/45* (2013.01)

(56) References Cited

U.S. PATENT DOCUMENTS 11,327,195 B2 * 5/2022 Söllner ................ G01V 1/303
2016/0313465 A1 10/2016 Söllner

OTHER PUBLICATIONS

Wapenaar, Kees, et al., "On the relation between seismic interferometry and the simultaneous-source method," European Association of Geoscientists & Engineers, 2012, pp. 1-22.

* cited by examiner $$\sum_{j=1}^{N_s} P_{up}\left(\vec{x}_r, z_r, \omega \mid \vec{x}_{s_j}, z_{s_j}\right) S_d(\omega) = -2\rho\Delta\vec{x} \underbrace{\begin{bmatrix} a_{z,1}^{dn} & \cdots & a_{z,k}^{dn} & \cdots & a_{z,N}^{dn} \end{bmatrix}}_{1002} \underbrace{\begin{bmatrix} R\left(\vec{x}_r, z_r, \omega \mid \vec{x}_1, z\right) \\ \vdots \\ R\left(\vec{x}_r, z_r, \omega \mid \vec{x}_k, z\right) \\ \vdots \\ R\left(\vec{x}_r, z_r, \omega \mid \vec{x}_N, z\right) \end{bmatrix}}_{1004}$$

FIG. 10

$$\vec{c} = \left[\vec{a}_z^{dn}\right]^H p_{up} = \begin{bmatrix} \left[a_{z,1}^{dn}\right]^H \\ \vdots \\ \left[a_{z,k}^{dn}\right]^H \\ \vdots \\ \left[a_{z,N}^{dn}\right]^H \end{bmatrix} \overset{1102}{\sum_{j=1}^{N_s}} P_{up}\left(\vec{x}_r, z_r, \omega \mid \vec{x}_{s_j}, z_{s_j}\right)$$

FIG. 11

$$[\overline{a}_{2}^{dn}]^H \overline{a}_{2}^{dn} = \begin{bmatrix} [a_{2,1}^{dn}]^H & \cdots & [a_{2,k}^{dn}]^H & \cdots & [a_{2,N}^{dn}]^H \end{bmatrix} \begin{bmatrix} a_{2,1}^{dn} & \cdots & a_{2,k}^{dn} & \cdots & a_{2,N}^{dn} \end{bmatrix}$$

$$= \begin{bmatrix} [a_{2,1}^{dn}]^H a_{2,1}^{dn} & \cdots & [a_{2,k}^{dn}]^H a_{2,k}^{dn} & \cdots & [a_{2,N}^{dn}]^H a_{2,N}^{dn} \\ \vdots & \cdots & \vdots & \cdots & \vdots \\ [a_{2,1}^{dn}]^H a_{2,1}^{dn} & \cdots & [a_{2,k}^{dn}]^H a_{2,k}^{dn} & \cdots & [a_{2,N}^{dn}]^H a_{2,N}^{dn} \\ \vdots & \cdots & \vdots & \cdots & \vdots \\ [a_{2,N}^{dn}]^H a_{2,1}^{dn} & \cdots & [a_{2,N}^{dn}]^H a_{2,k}^{dn} & \cdots & [a_{2,N}^{dn}]^H a_{2,N}^{dn} \end{bmatrix}$$

FIG. 12

SEISMIC IMAGING WITH SOURCE DECONVOLUTION FOR MARINE VIBRATORS WITH RANDOM SOURCE SIGNATURES

CROSS-REFERENCE TO RELATED APPLICATION

This application claims the benefit of Provisional Application 62/892,984, filed Aug. 28, 2019, which application is hereby incorporated by reference as if entirely set forth herein.

BACKGROUND

Marine seismology companies invest heavily in the development of marine seismic surveying equipment and seismic data processing techniques in order to obtain accurate, high-resolution images of subterranean formations located beneath a body of water. Such images may be used, for example, to determine the structure of the subterranean formations, to discover oil and natural gas reservoirs, and to monitor oil and natural gas reservoirs during production. A typical marine seismic survey is performed with one or more survey vessels that tow a seismic source and many streamers through the body of water. The survey vessel contains seismic acquisition equipment, such as navigation control, seismic source control, seismic receiver control, and recording equipment. A seismic source control controls activation of the one or more seismic sources at selected times or locations. A seismic source may be an impulsive source comprised of an array of air guns that are activated to produce impulses of acoustic energy. Alternatively, a seismic source may be a marine vibrator that emits acoustic energy over a longer time period. The acoustic energy generated by a seismic source spreads out in all directions. A portion of the acoustic energy travels down through the water and into a subterranean formation to propagate as sound waves within the subterranean formation. At each interface between different types of liquid, rock and sediment, a portion of the sound wave is refracted, a portion is transmitted, and another portion is reflected into the body of water to propagate as a reflected wavefield toward the water surface. The streamers are elongated spaced apart cable-like structures towed behind a survey vessel in the direction the survey vessel is traveling and are typically arranged substantially parallel to one another. Each streamer contains many seismic receivers or sensors that detect pressure and/or particle motion wavefields of the sound waves. The streamers collectively form a seismic data acquisition surface that records wavefields as seismic data in the recording equipment. The recorded pressure and or particle motion wavefields are processed to generate images of the subterranean formation, enabling geoscientist to identify potential hydrocarbon reservoirs that may be suitable for oil and gas extraction and to monitor hydrocarbon reservoirs under production.

DESCRIPTION OF THE DRAWINGS

FIG. 10 shows an expanded representation of matrices that represent a relationship between an upgoing pressure wavefield, a downgoing vertical acceleration wavefield, and subsurface reflectivity.

FIG. 11 shows an expanded representation of a matrix.

FIG. 12 shows an expanded representation of a matrix.

DETAILED DESCRIPTION

Figure 1A:
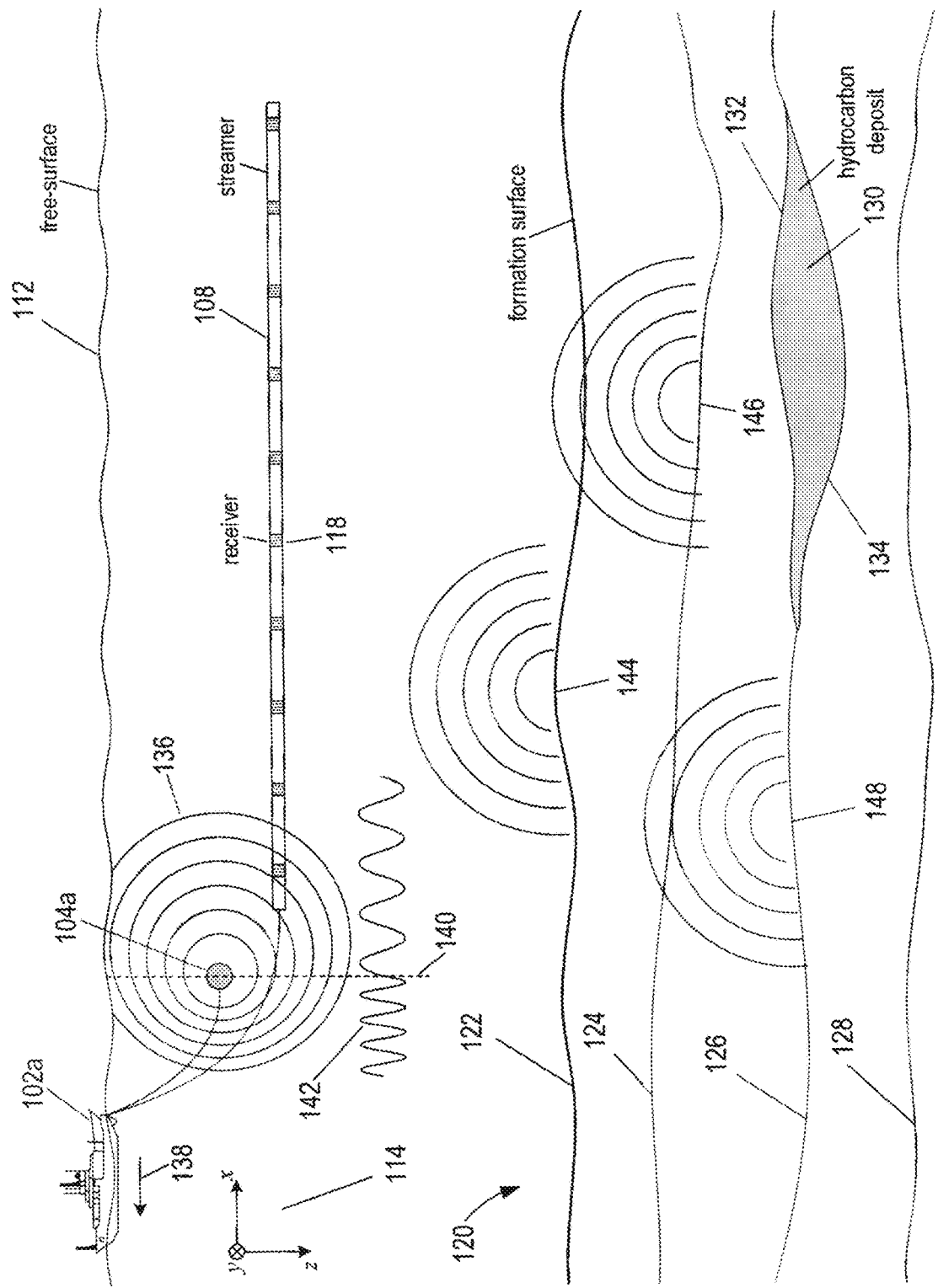
FIGS. 1A-1B show side-elevation and top views, respectively, of an example marine seismic data acquisition system.

Seismic imaging is a process of forming an image of elastic impedance responses of a subterranean formation using seismic data recorded in a marine survey. The resulting images provide two- or three-dimensional views of interfaces between different layers of rock and sediments, faults, and salt domes and are visually displayed on monitors, projected onto screens, or displayed using other visual display devices. Geoscientists in the oil and gas industry view images of subterranean formations to identify rock interfaces that reveal potential oil and natural gas accumulations. After a well has been drilled, marine surveys are performed around the well site to collect more seismic data while the oil or natural gas accumulations are extracted. These images of the subterranean formation may be used to monitor extraction of oil or natural gas over time. Without accurate, high-resolution images of a subterranean formation, geoscientist would have no way of knowing or understanding the internal geological structure of a subterranean formation. Those in the petroleum industry would have to resort to randomly drilling test wells in the hopes of finding a reservoir of oil or natural gas. Seismic imaging provides visual information about the structure of a subterranean formation at a much lower cost than relying on test drilling alone.

Processes and systems described herein are directed to imaging a subterranean formation using seismic data recorded in a marine survey with a vibrational source that is moving in a body of water above a subterranean formation. The vibrational source may comprise a single marine vibrator or a plurality of marine vibrators. Each marine vibrator generates non-impulsive acoustic energy in the form of an oscillating pressure wavefield over time (e.g., on the order of about 5 seconds or longer). The oscillating pressure wavefield generated by a marine vibrator is called a "sweep" and the frequency of oscillation of a sweep is called the sweep signature or simply the "signature." The marine vibrators described herein are operated to generate random sweeps with random signatures. Reflections from the subterranean formation may be continuously recorded in seismic data as one or more marine vibrators are activated to continuously generate random sweeps. Alternatively, reflections from the subterranean formation may be recorded in shot records for each activation of a marine vibrator. The recorded seismic data comprises a signal component and noise. The signal component is the part of the recorded seismic data that relates to the geological structure of a subterranean formation under investigation and is used to generate images of the subterranean formation. The noise comprises all other components of the recorded seismic data that contaminate an image. The noise may be divided into two components: random noise and coherent noise. Random noise is statistically random and may be removed using conventional noise filtering techniques. However, coherent noise comprises components of wavefields generated by the marine survey itself but are of no direct interest for geological interpretation and cannot be attenuated or removed using conventional noise filtering techniques. Coherent noise includes receiver ghosts and source wavefield effects created by the one or more random sweeps. Receiver ghosts are wavefields reflected upward from the subterranean formation and then downward from the free surface before being detected by the receivers. Receiver ghosts create a ghost image of the subterranean formation within an actual image of the subterranean formation. The source wavefield effects include the random sweeps, source ghost reflections of the random sweeps from the free surface, source motion effects, such as Doppler effects, and directivity, which is variation in the random sweep amplitude with angle. Receiver ghosts and the source wavefield effects contaminate seismic images by reducing image resolution, obscuring interfaces between rock layers and other geological structures. Processes and systems described herein attenuate the receiver ghost and the source wavefield effects recorded in seismic data, thereby reducing effects of coherent noise contamination and increasing image resolution that would otherwise contaminate images generated from the seismic data.

Marine Seismic Surveying

Figure 1B:
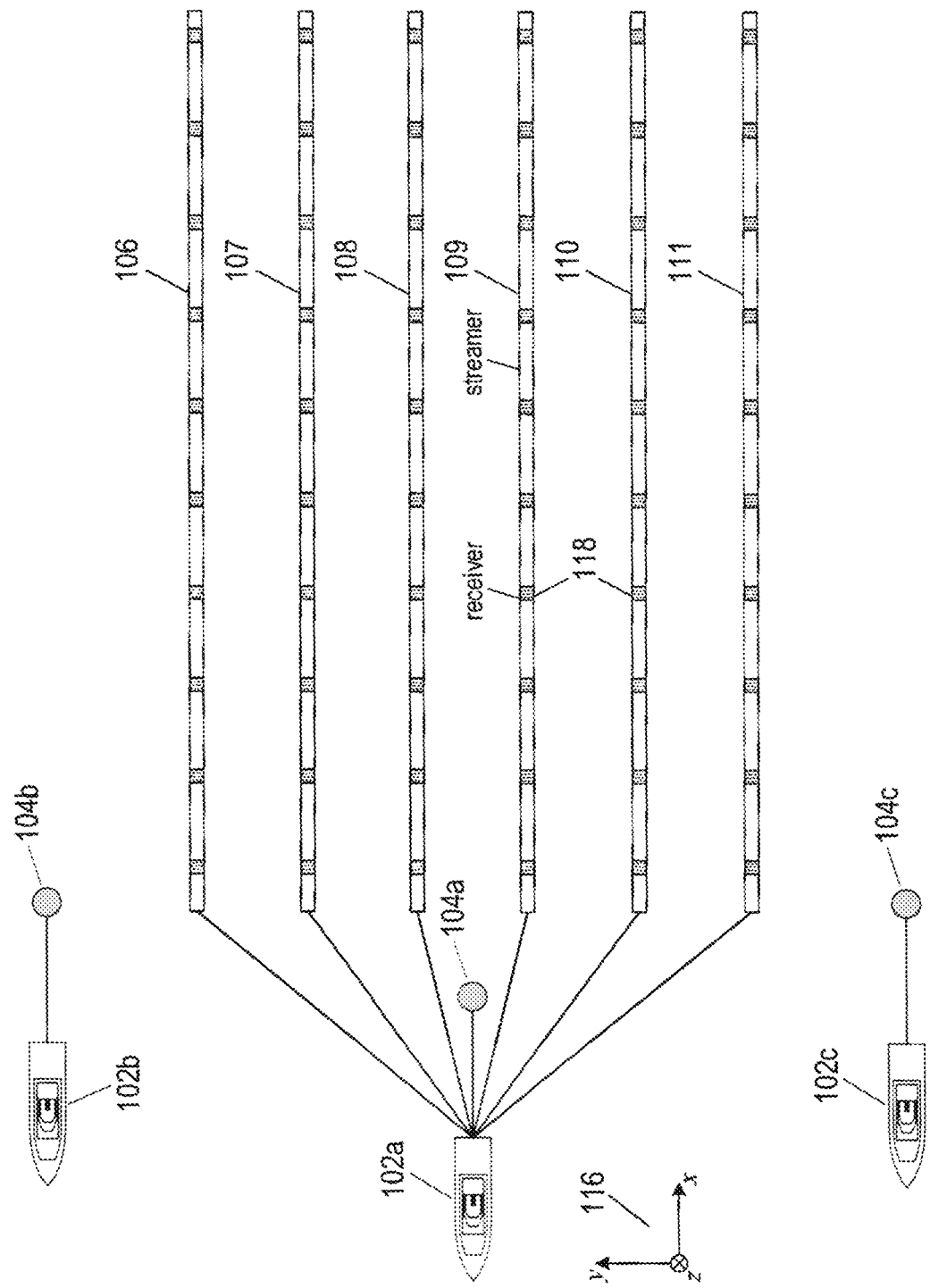

FIGS. 1A-1B show a side-elevation view and a top view, respectively, of an example marine seismic data acquisition system comprising exploration seismology survey vessels 102a-102c and vibrational sources 104a-104c. The body of water can be, for example, an ocean, a sea, a lake, a river, or any portion thereof. In this example, the survey vessel 102a tows six streamers 106-111 below the free surface of a body of water. Each streamer is attached at one end to the survey vessel 102a via a streamer-data-transmission cable. A data acquisition surface is not limited to six streamers as shown in FIG. 1B. In practice, the number of streamers used to form a data acquisition surface can range from as few as one streamer to as many as 20 or more streamers. In certain implementations, a marine survey may be performed with a single survey vessel towing a single vibrational source, such as the survey vessel 102a towing the vibrational source 104a in FIG. 1A. Marine surveys are not limited to using a single vibrational source. In other implementations, a marine survey may be performed with two or more survey vessels that two or more vibrational sources. For example, FIG. 1B shows two additional survey vessels 102b and 102c towing corresponding vibrational sources 104b and 104c.

FIG. 1A includes an xz-plane 114, and FIG. 1B includes an xy-plane 116, of the same Cartesian coordinate system having three orthogonal, spatial coordinate axes labeled x, y, and z. The coordinate system specifies orientations and coordinate locations within the body of water. The x-axis specifies the position of a point in a direction parallel to the length of the streamers or the direction the survey vessel is traveling and is called the "in-line" direction. The y-axis specifies the position of a point in a direction perpendicular to the x-axis and substantially parallel to the free surface 112 and is called the "cross-line" direction. The z-axis, also referred to as the "depth" axis, specifies the position of a point in a direction perpendicular to the xy-plane (i.e., perpendicular to the free surface 112) with the positive z-direction pointing downward away from the free surface 112.

The streamers may be towed to form a planar horizontal seismic data acquisition surface with respect to the free surface. However, in practice, the streamers may be smoothly varying due to active sea currents and weather conditions. A seismic data acquisition surface is not limited to the parallel streamers shown in FIGS. 1A and 1B. In other implementations, the streamers may be towed with progressively larger streamer separation in the crossline direction toward longer distances from the survey vessel 102a in a process called "streamer fanning." Streamer fanning may improve coverage at far source/receiver offsets without compromising seismic data resolution or seismic data quality and may also increase acquisition efficiency by reducing seismic data infill. In still other implementations, the streamers may be towed with a downward slant with increasing distance from the survey vessel 102a.

The streamers 106-111 are typically long cables containing power and data-transmission lines coupled to receivers (represented by shaded rectangles) such as receiver 118 that are spaced-apart along the length of each streamer. The data transmission lines couple receivers to seismic data acquisition equipment, computers, and data-storage devices located onboard the survey vessel 102. Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. Note that in other implementations buoys may be attached to the streamers and used to maintain the orientation and depth of the streamers below the free surface 112.

Figure 2:
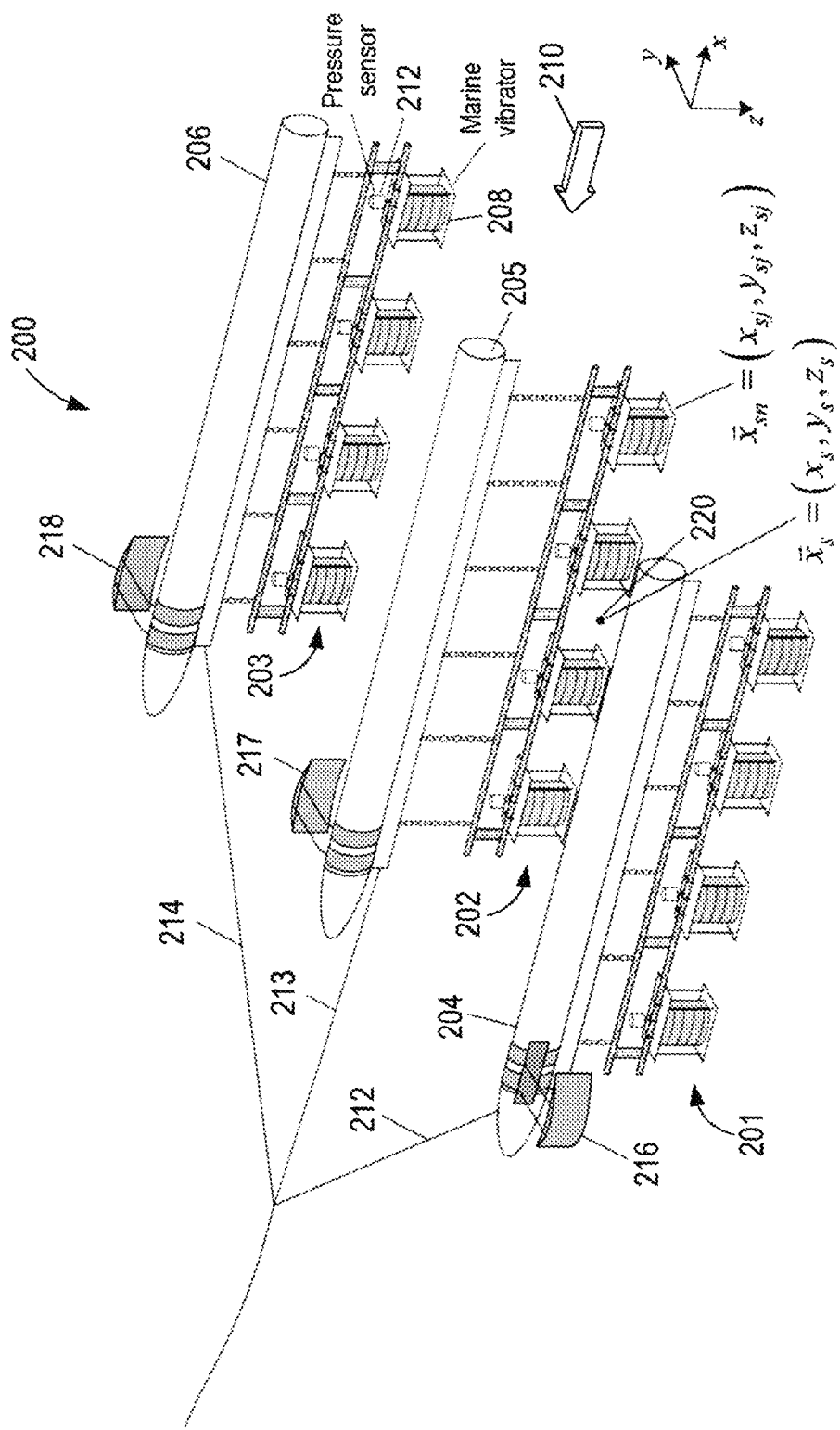
FIG. 2 shows an isometric view of an example vibrational source.

Each of the vibrational sources 104a, 104b, and 104c may be comprised of a single marine vibrator or an array of marine vibrators. FIG. 2 shows an isometric view of an example vibrational source 200 comprising an array of marine vibrators. The array of marine vibrators comprises three sub-arrays 201-203 of marine vibrators. Each marine vibrator is suspended from one of three floats 204-206. For example, sub-array 203 includes a float 206 with four marine vibrators, such as marine vibrator 208, suspended below the float 206 in the body of water. In other implementations, each sub-array also includes pressure sensors. Each marine vibrator may have a corresponding pressure sensor that measures a pressure wavefield created by the corresponding marine vibrator as the vibrational source 200 moves in the direction represented by directional arrow 210. For example, pressure sensor 212 may be located approximately 1 m from corresponding marine vibrator 208. Each marine vibrator may also have a motion sensor mounted on the vibrating plates to record the vibrational signature of the marine vibrator. The sub-arrays are connected to cables 212-214 that include electrical wires that transmit electrical activation signals to each marine vibrator and transmit electrical signals generated by each pressure sensor or motion sensor back to the survey vessel. The vibrational source 200 includes steering devices 216-218 that may be used to steer and control the direction of the vibrational source 200 while being towed through the body of water. Point 220 represents the geometrical center of the marine vibrators with Cartesian coordinates denoted by $\vec{x}_s=(x_s, y_s, z_s)$. The Cartesian coordinates of each marine vibrator are denoted by $\vec{x}_{sj}=(x_{sj}, y_{sj}, z)$, where subscript "j" is a marine vibrator index. Each marine vibrator emits acoustic energy in the form of rapidly oscillating pressure wavefield that spreads outward in all directions and is called a "vibroseis sweep" or simple a "sweep." A sweep measured by a collocated pressure sensor is denoted by $s(t, \vec{x}_{sj})$. Note that vibrational sources are not limited to the example of twelve marine vibrators shown in FIG. 2. For example, the vibrational source 104a may have as few as one marine vibrator or as many as ten or more marine vibrators.

Returning to FIG. 1A, curve 122, the formation surface, represents a top surface of a subterranean formation 120 located at the bottom of the body of water. The subterranean formation 120 may include many subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, such as an oil or natural gas accumulation, the depth and positional coordinates of which may be determined, at least in part, by seismic imaging applied to the seismic data recorded during a marine seismic survey. As the survey vessel 102a moves over the subterranean formation 120, one or more marine vibrators of the vibrational sources 104a-104c produce acoustic energy over time that spreads out in all directions away from the vibrational sources 104a-104c. For the sake of simplicity, FIG. 1A shows acoustic energy expanding outward from the vibrational source 104a as a pressure wavefield 136 represented by semicircles of increasing radius centered at the vibrational source 104a. The outwardly expanding wavefronts from the vibrational source may be spherical but are shown in vertical plane cross section in FIG. 1A. The outward and downward expanding portion of the pressure wavefield 136 is called the "source wavefield" and any portion of the pressure wavefield 136 reflected downward from the free-surface 112 is called the "source ghost wavefield." Because the vibrational source 104a is moving, the source wavefield emitted from the vibrational source 104a is Doppler shifted, as represented by concentric circles shifted in the direction 138. Dashed line 140 separates the portion of the source wavefield traveling in the direction 138 from the portion of the source wavefield traveling in the opposite direction. Curve 142 represents a change in the wavelength (i.e., frequency) in the source wavefield due to the Doppler effect. Portions of the source wavefield traveling in the forward direction 138 have a decreased wavelength (i.e., increased frequency). By contrast, portions of the source wavefield traveling in the aft direction have an increased wavelength (i.e., decreased frequency). The source wavefield 136 penetrates the formation surface 122 of the subterranean formation 120, at which point the wavefields may be partially reflected from the formation surface 122 and partially refracted downward into the subterranean formation 120, becoming elastic waves within the subterranean formation 120. In the body of water, the source wavefield primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signals generated by the marine vibrators. As shown in FIG. 1A, waves of significant amplitude may be generally reflected from points on or close to the formation surface 122, such as point 144, and from points on or very close to interfaces in the subterranean formation 120, such as points 146 and 148.

The waves comprising the reflected wavefield may be generally reflected at different times within a range of times following the source wavefield. A point on the formation surface 122, such as the point 144, may receive a pressure disturbance from the source wavefield more quickly than a point within the subterranean formation 120, such as point 148. Similarly, a point on the formation surface 122 directly beneath the vibrational source 104a may receive the pressure disturbance sooner than a more distant-lying point on the formation surface 122. Thus, the times at which waves are reflected from various points within the subterranean formation 120 may be related to the distance, in three-dimensional space, of the points from the vibrational source 104a.

Acoustic and elastic waves may travel at different velocities within different materials as well as within the same material under different pressures. Therefore, the travel times of the source wavefield and reflected wavefield may be functions of distance from the source as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflectors within the subterranean formation 120 of interest to exploration seismologists.

Figure 3:
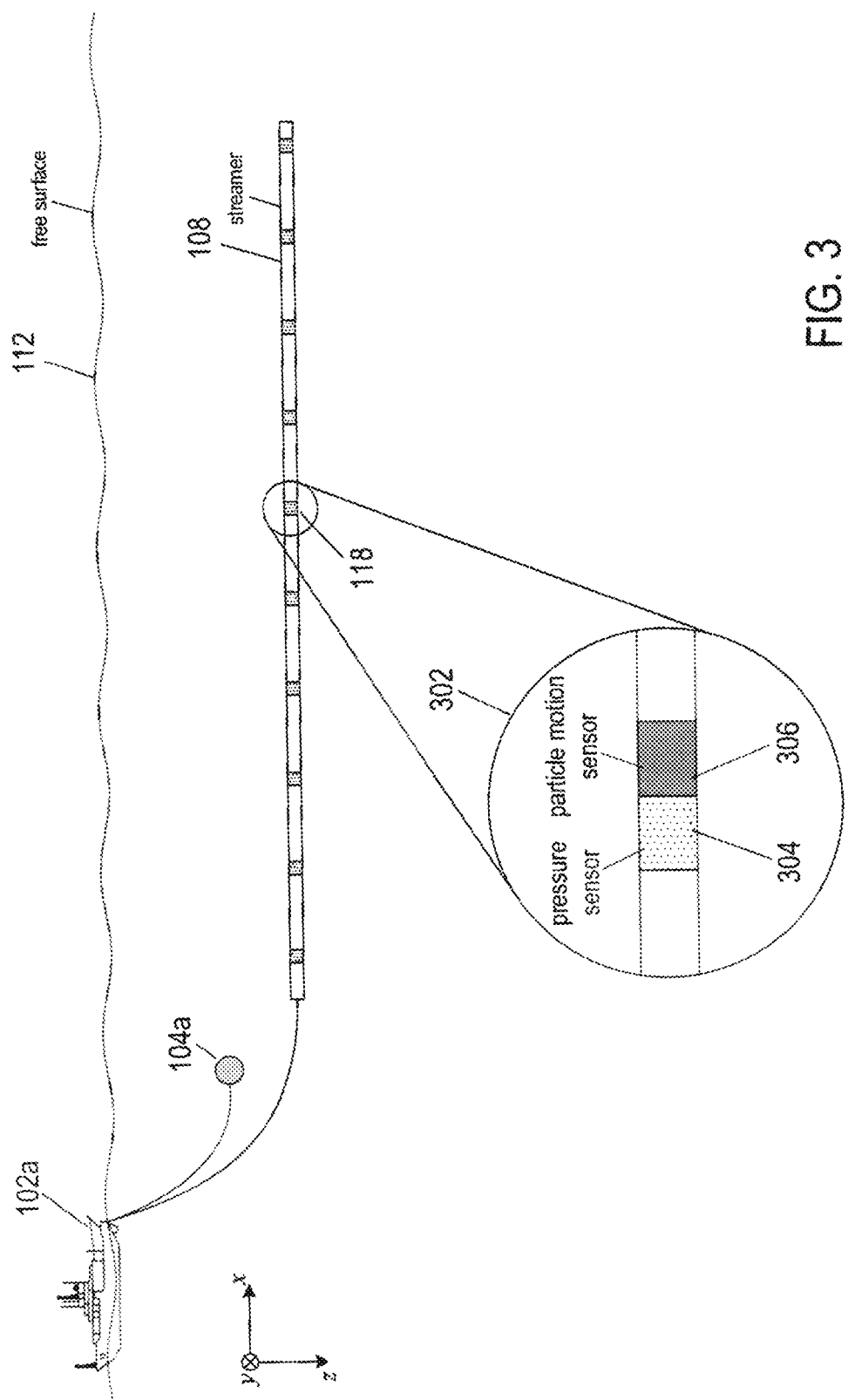
FIG. 3 shows a side-elevation view of a marine seismic data acquisition system and a magnified view of a receiver.

Each receiver 118 may be a multicomponent sensor including particle motion sensors and a pressure sensor. A pressure sensor detects variations in water pressure over time. The term "particle motion sensor" is a general term used to refer to a sensor that may detect particle displacement, particle velocity, or particle acceleration over time. FIG. 3 shows a side-elevation view of the marine seismic data acquisition system and a magnified view 302 of the receiver 118. In this example, the magnified view 302 reveals that the receiver 118 is a multicomponent sensor comprising a pressure sensor 304 and a particle motion sensor 306. The pressure sensor may be, for example, a hydrophone. Each pressure sensor is a non-directional sensor that measures changes in a hydrostatic pressure wavefield over time to produce pressure wavefield data denoted by $p(\vec{x}_R, \vec{x}_s, t)$, where t represents time. The notation $\vec{x}_R$ represents the Cartesian coordinates $(x_r, y_r, z_r)$ or coordinates $(\vec{x}_r, z_r)$, where $\vec{x}_r$ represents $(x_r, y_r)$. The particle motion sensors are directional sensors that are responsive to water motion in a particular direction. In general, particle motion sensors detect particle motion in a particular direction and may be responsive to such directional displacement of the particles, velocity of the particles, or acceleration of the particles. A particle motion sensor that measures particle displacement generates particle displacement data denoted by $g_{\vec{n}}(\vec{x}_R, \vec{x}_s, t)$, where the vector $\vec{n}$ represents the direction along which particle displacement is measured. A particle motion sensor that measures particle velocity (i.e., particle velocity sensor) generates particle velocity wavefield data denoted by $v_{\vec{n}}(\vec{x}_R, \vec{x}_s, t)$. A particle motion sensor that measures particle acceleration (i.e., accelerometer) generates particle acceleration data denoted by $a_{\vec{n}}(\vec{x}_R, \vec{x}_s, t)$. The data generated by one type of particle motion sensor may be converted to another type. For example, particle displacement data may be differentiated to obtain particle velocity wavefield data, and particle acceleration data may be integrated to obtain velocity wavefield data.

The term "particle motion data" refers to particle displacement data, particle velocity wavefield data, or particle acceleration data. The term "seismic data" refers to pressure wavefield data and/or particle motion data. Pressure wavefield data may also be called the "pressure wavefield." Particle displacement data represents a particle displacement wavefield, particle velocity wavefield data represents a particle velocity wavefield, and particle acceleration data represents a particle acceleration wavefield. The particle displacement, velocity, and acceleration wavefield data are correspondingly called particle displacement, velocity, and acceleration wavefields.

The particle motion sensors are typically oriented so that the particle motion is measured in the vertical direction (i.e., $\vec{n}=(0,0,z)$) in which case $g_z(\vec{x}_R, \vec{x}_s, t)$ is called vertical wavefield displacement, $v_z(\vec{x}_R, \vec{x}_s, t)$ is called vertical velocity wavefield, and $a_z(\vec{x}_R, \vec{x}_s, t)$ is called vertical acceleration wavefield. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_R, \vec{x}_s, t)$, each receiver may include a particle motion sensor that measures the wavefield in the inline direction in order to obtain the inline velocity wavefield, $v_x(\vec{x}_R, \vec{x}_s, t)$, and a particle motion sensor that measures the wavefield in the crossline direction in order to obtain the crossline velocity wavefield, $v_y(\vec{x}_R, \vec{x}_s, t)$. In certain implementations, the receivers may be only pressure sensors, and in other implementations, the receivers may be only particle motion sensors. The three orthogonal velocity wavefields form a velocity wavefield vector $\vec{v} = (v_x, v_y, v_z)$.

The streamers 106-111 and the survey vessel 102a may include sensing electronics and data-processing facilities that allow seismic data generated by each receiver to be correlated with the time each marine vibrator is activated, absolute positions on the free surface 112, and absolute three-dimensional positions with respect to an arbitrary three-dimensional coordinate system. The pressure wavefield and particle motion wavefield may be stored at the receiver and/or may be sent along the streamers and data transmission cables to the survey vessel 102a, where the data may be stored electronically, magnetically, or optically on data-storage devices located onboard the survey vessel 102a and/or transmitted onshore to data-storage devices located in a seismic data-processing facility.

Each pressure sensor and particle motion sensor may include an analog-to-digital converter that converts time-dependent analog signals into discrete time series data that consist of consecutively measured values called "amplitudes" separated in time by a sample rate. The time series data generated by a pressure or particle motion sensor is called a "trace," which may consist of thousands of samples collected at a typical sample rate of about 1 to 5 samples per millisecond. A trace includes a recording of a subterranean formation response to acoustic energy that passes from an activated marine vibrator, into the subterranean formation where a portion of the acoustic energy is reflected and or refracted, and ultimately detected by a sensor as described above. Each trace records variations in time-dependent amplitudes that correspond to fluctuations in acoustic energy of the wavefield measured by the sensor. In general, each trace is an ordered set of discrete spatial and time-dependent pressure or motion sensor amplitudes denoted by:

$$tr(\vec{x}_R, \vec{x}_{sj}, t) = \{U(\vec{x}_R, \vec{x}_{sj}, t_l)\}_{l=0}^{L-1} \quad (1)$$

where tr represents pressure, particle displacement, particle velocity, or particle acceleration amplitude;

U represents amplitude;

$t_l$ is the l-th sample time; and

L is the number of time samples in the trace.

The coordinate location $\vec{x}_r$ of each receiver may be calculated from global position information obtained from one or more global positioning devices located along the streamers and/or the towing vessel, from depth measuring devices, such as hydrostatic pressure sensors, and the known geometry and arrangement of the streamers and receivers. The receiver and marine vibrator locations varies with time and may also be denoted by $\vec{x}_R = \vec{x}_R(t) = (x_r(t), y_r(t), z_r(t))$ and $\vec{x}_{sj} = \vec{x}_{sj}(t) = (x_{sj}(t), y_{sj}(t), z_{sj}(t))$. Each trace also includes a trace header not represented in Equation (1) that identifies the specific receiver that generated the trace, receiver and source GPS spatial coordinates, receiver depth, and may include time sample rate and the number of time samples.

Reflected wavefields from the subterranean formation typically arrive first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather. A common-shot gather comprises traces of seismic data with the same marine vibrator coordinate but different receiver coordinates in the inline direction, such as receiver coordinates along a streamer. A collection of traces sorted into common-receiver domain are called a common receiver gather. A common-receiver gather comprises traces of seismic data with the same receiver coordinate but different source coordinates. The portion of the acoustic signal that is reflected into the body of water from the subterranean formation and that travels directly to the receivers is called a primary reflected wavefield or simply a "primary." Other portions of the acoustic energy that are reflected upward into the body of water and that reverberate between the free surface and the subterranean formation before reaching the receivers are called free-surface multiple reflected wavefields or simply "free-surface multiples." Other portions of the acoustic energy that are reflected upward into the body of water directly to receivers after having reverberated within the subterranean formation are called subsurface multiple reflections or simply "subsurface multiples."

Figure 4A:
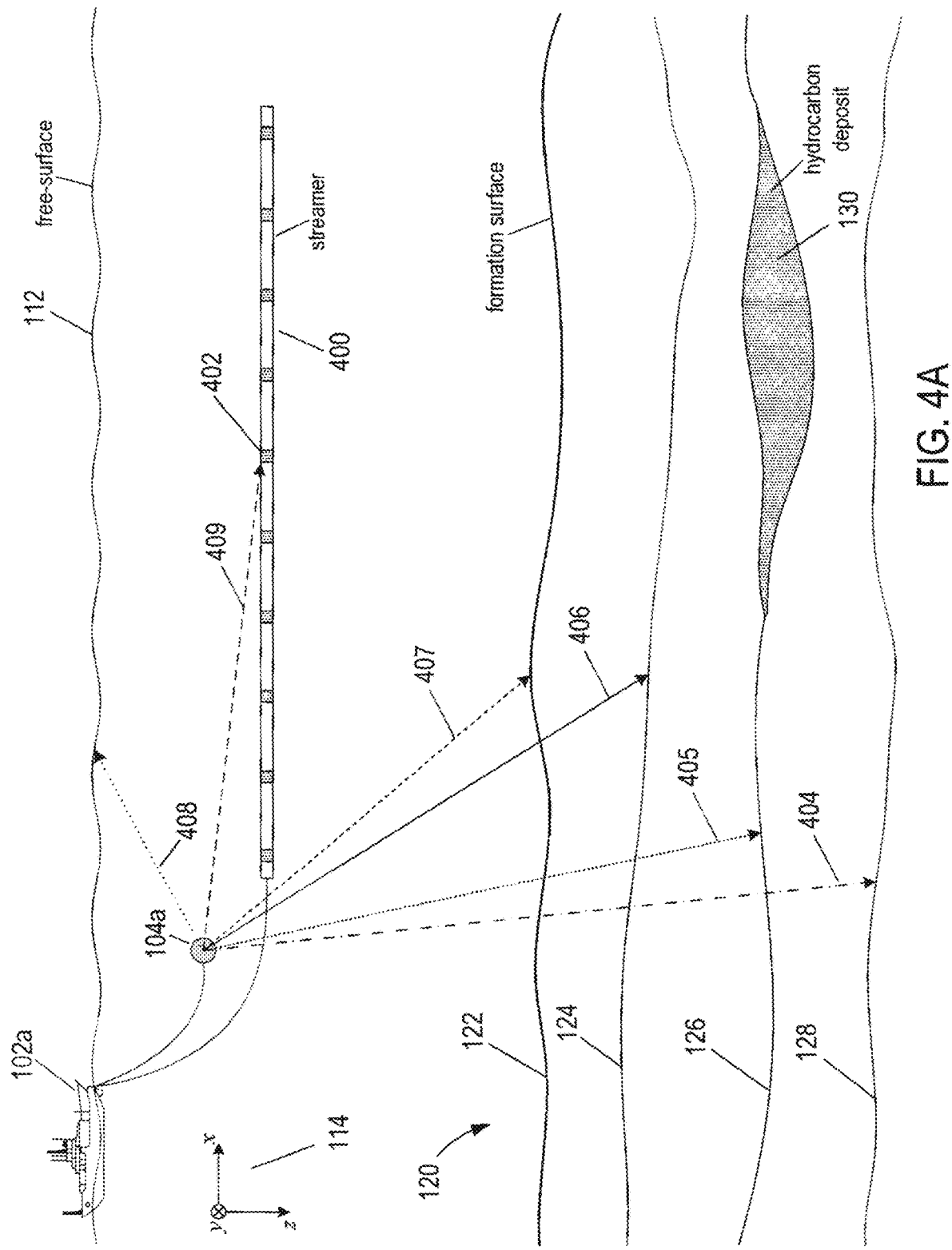
FIGS. 4A-4C show example ray paths of different ways acoustic energy emitted from a vibrational source reverberates between a free surface and reflectors within a subterranean formation.
Figure 4B:
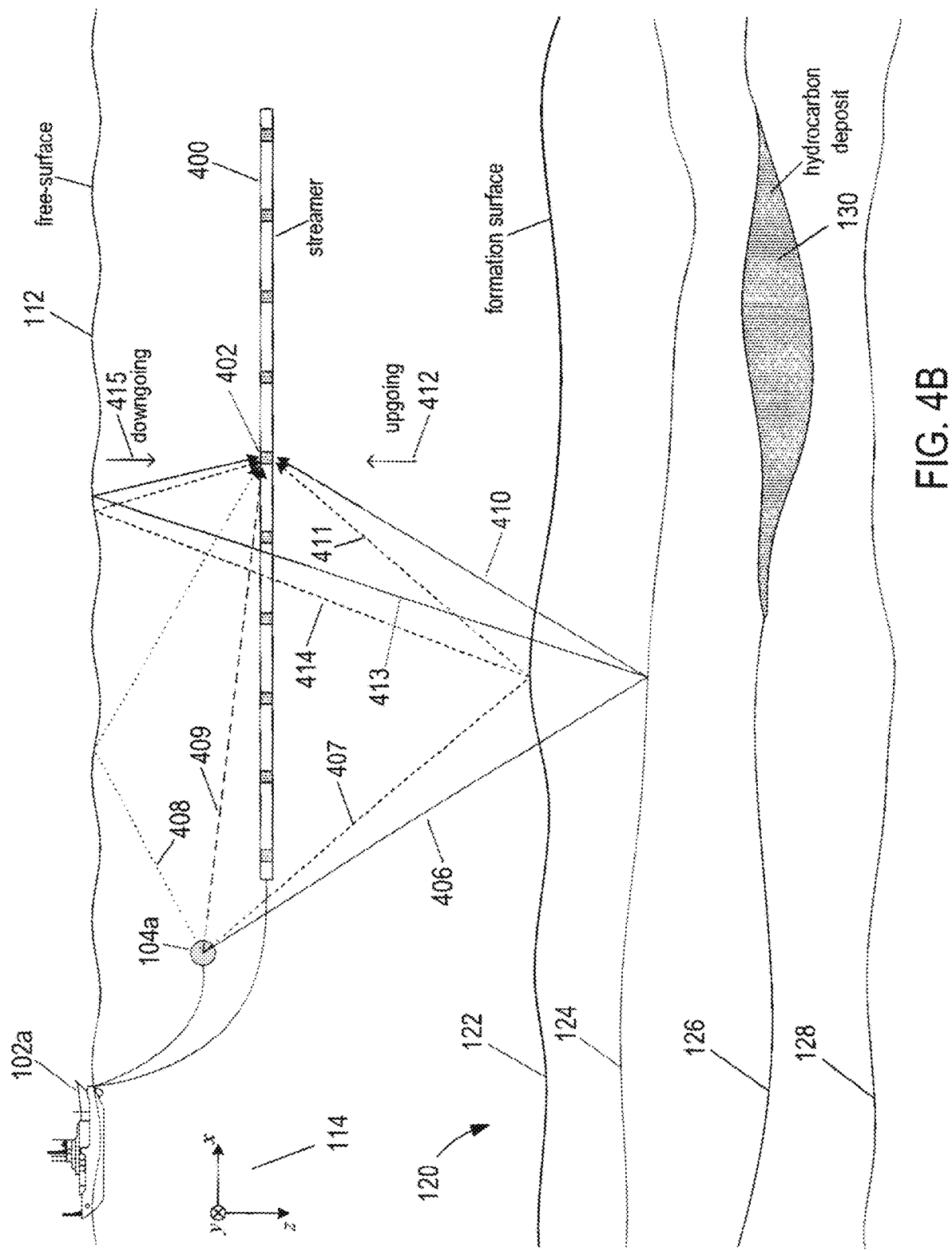
Figure 4C:
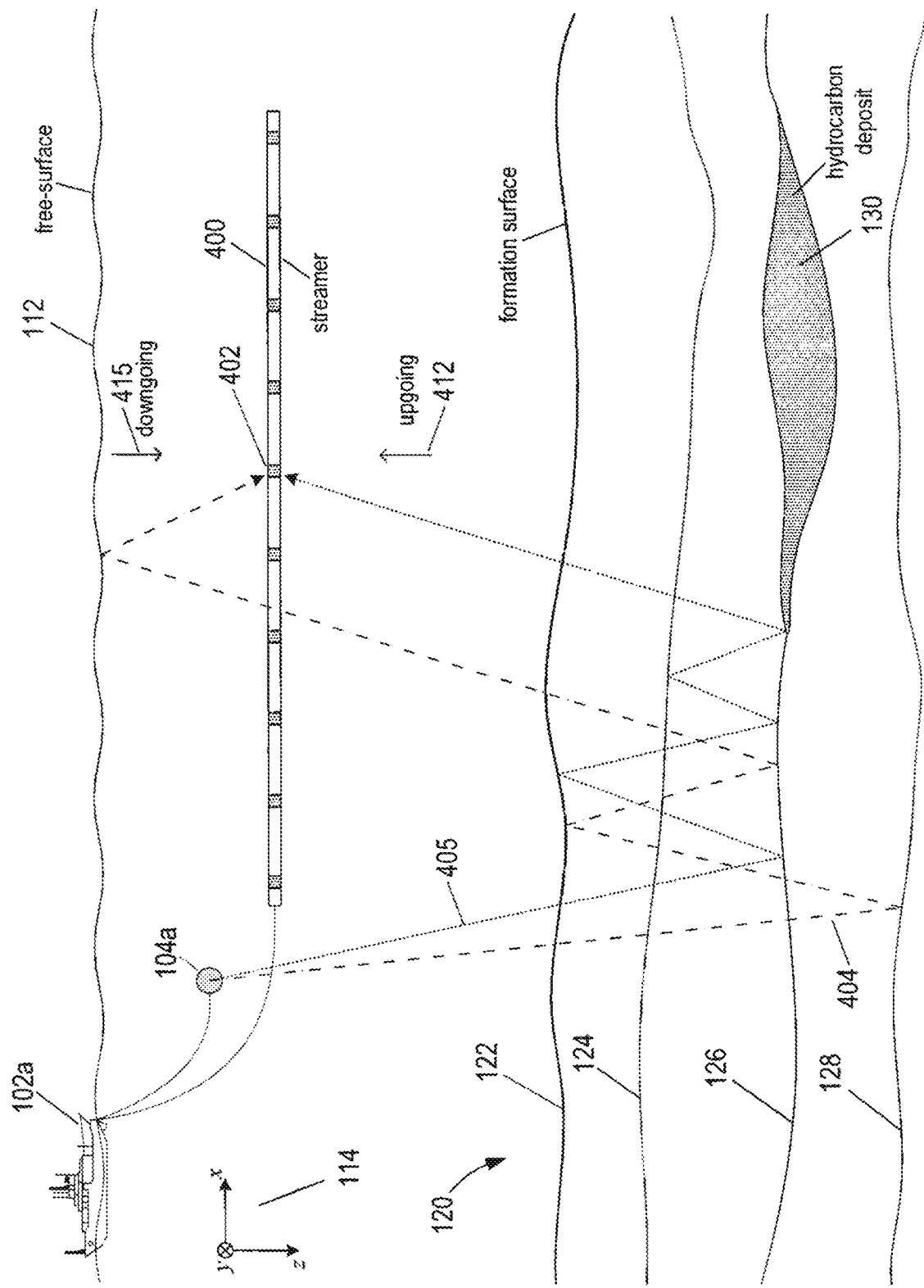

FIGS. 4A-4C show example ray paths of different ways acoustic energy emitted from the vibrational source 104a reverberates between the free surface 112 and reflectors with the subterranean formation 120 before reaching the receiver 402. For the sake of simplicity, FIGS. 4A-4C illustrate only a few of many possible ray paths acoustic energy of an acoustic signal created by a marine vibrator of the vibrational source 104a may travel before reaching the receiver 402. In FIG. 4A, directional arrows 404-409 represent ray paths of different portions of the acoustic signal generated by the vibrational source 104a. For example, ray paths 404-407 represent portions of the acoustic signal that penetrate to different interfaces of the subterranean formation 102 and ray path 408 represents a portion of the acoustic signal that reaches the free surface 112. Ray path 409 represents the source signature, which is a portion of the sweep that travels directly to the receiver 402. In FIG. 4B, ray path 408 is extended to present a downward reflection from the free surface 112 (i.e., source ghost). Ray paths 410 and 411 represent reflections from the interface 124 and the formation surface 122 that travel directly to the receiver 402, which are called "upgoing primary reflections" or "primaries." as indicated by upgoing directional arrow 412. Ray paths 413 and 414 represent reflections from the interface 124 and the formation surface 122 followed by downward reflections from the free surface 112 before traveling directly to the receiver 402, which are called "downgoing reflections" as indicated by directional arrow 415. In FIG. 4C, ray paths 404 and 405 are extended to represent examples of multiple reflections between interfaces within the subterranean formation 120 and the free surface 112. Extended ray path 404 represents a downgoing free-surface multiple. Extended ray path 405 represents an upgoing multiple. In FIGS. 4B-4C, wavefields that are reflected downward from the free surface 112 before reaching the receivers, as represented by ray paths 413, 414, and 404, are examples of "downgoing wavefields" that may also be called "ghost wavefields" or "receiver ghosts." In FIGS. 4B-4C, wavefields that are reflected upward from the subterranean formation 120, before reaching the receivers, as represented by ray paths 410, 411, and 405, are examples of "upgoing wavefields." Seismic data may also include acoustic energy that propagated along interfaces as head waves (not shown) before being reflected upward to the surface 122 and acoustic energy that propagated into layers with velocity gradients that increase with depth due to compression, creating diving waves (not shown) that are gradually turned upward to the surface 122.

Each trace records the source signature, source ghost, primaries, and various types of free surface and subsurface multiples. For example, a pressure wavefield $p(\vec{x}_R, \vec{x}_{sj}, t)$ generated at the receiver 402 records hydrostatic pressure changes due to the sweep signature, source ghost, primaries, and multiples created by activating a marine vibrator. A vertical velocity wavefield $v_z(\vec{x}_R, \vec{x}_{sj}, t)$, also generated at the receiver 402, records the particle velocity changes due to the direct source wavefield, source ghost, primaries, and multiples. The pressure wavefield $p(\vec{x}_R, \vec{x}_{sj}, t)$ and the vertical velocity wavefield $v_z(\vec{x}_R, \vec{x}_{sj}, t)$ record both upgoing and downgoing pressure and vertical velocity wavefields, respectively, that reach the receiver 402.

Subterranean formations may also be surveyed using ocean bottom seismic techniques. In one implementation, these techniques may be performed with ocean bottom cables ("OBCs") laid on or near the water bottom. The OBCs are similar to towed streamers described above in that the OBCs include spaced-apart receivers, such as collocated pressure and/or particle motion sensors, deployed approximately every 25 to 50 meters. In other implementation, ocean bottom nodes ("OBNs") may be deployed along the formation surface. Each node may have collocated pressure and, or particle motion sensors The OBCs and OBNs may be electronically connected to an anchored recording vessel that provides power, instrument command and control of the pressure and/or vertical velocity wavefield sent to recording equipment located on board the vessel. Traces of recorded seismic data using streamers, as described above, OBCs, or OBNs may processed as described below.

Figure 5:
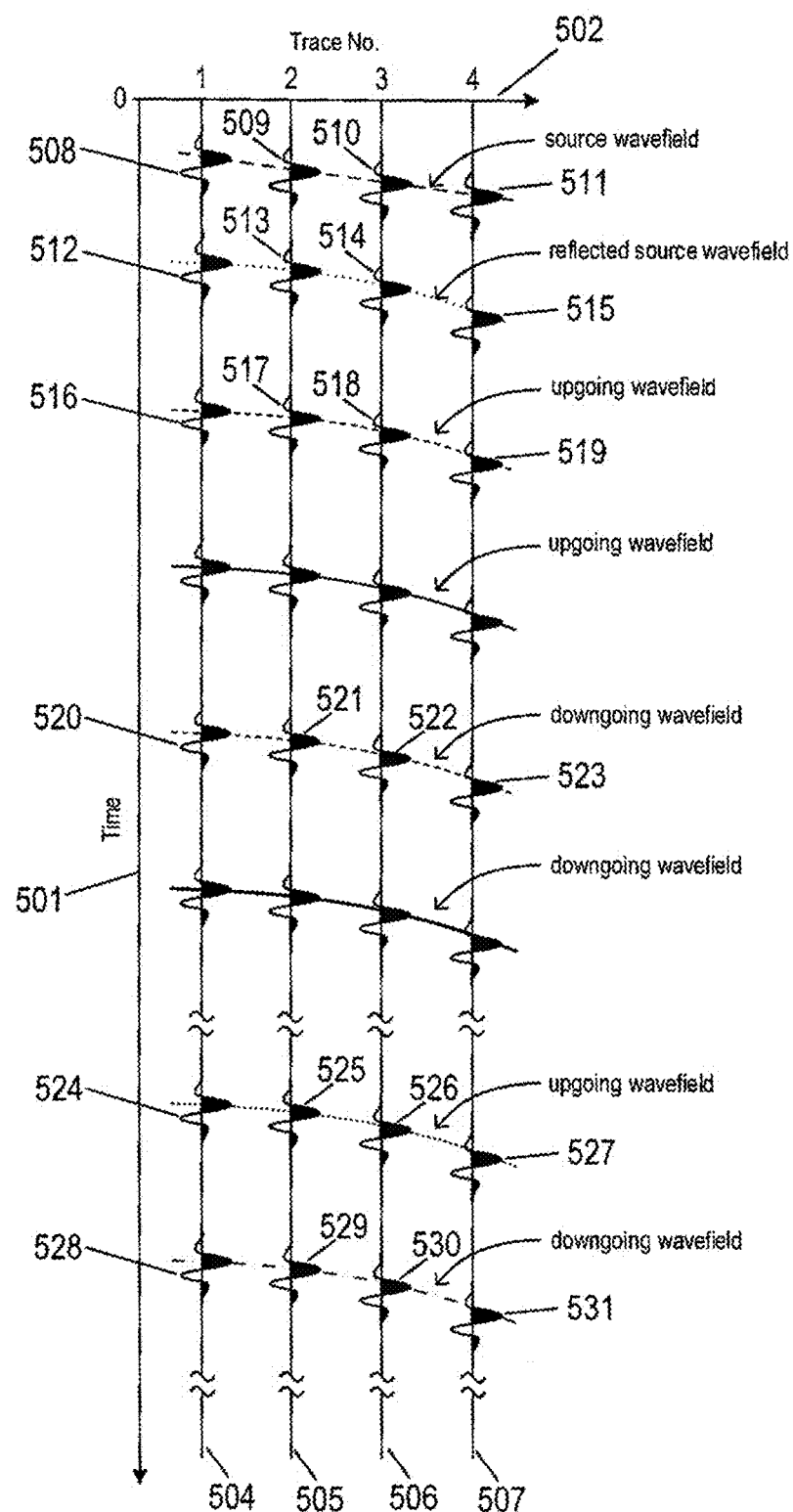
FIG. 5 shows an example common-shot gather of four example traces of wavefields measured by four adjacent receivers.

FIG. 5 shows an example common-shot gather of four example traces of wavefields measured by four adjacent receivers located along the streamer 400 shown in FIGS. 4A-4C. Vertical axis 501 represents time. Horizontal axis 502 represents trace numbers (i.e., channels) with trace "1" representing the seismic data generated by a receiver located closer to the vibrational source 104 than trace "4" representing the seismic data generated by a receiver located farther away from the vibrational source 104. The vibrational source 104 is activated at time zero. The distances along the traces 504-507 from time zero to the locations of the wavelets represent travel times of the acoustic energy that is output from the vibrational source 104 and eventually reaches the receivers located along the streamer 400. The traces 504-507 may represent variations in the amplitude of either the pressure wavefield or the particle motion wavefield measured by four adjacent receivers of the streamer 400. The example traces record events, such as an impulse wavefield and a reflected wavefield from a surface or interface, as wavelets located along patterned curves that correspond to the example ray paths that reach the receiver 402 in FIGS. 4A-4C. For example, wavelets 508-511 record the source wavefield of the vibrational source 104 that travels directly to the receivers as represented by dashed ray path 409 in FIG. 4A. Wavelets 512-515 record the reflected source wavefield (i.e., source ghost) as represented by dotted ray path 408 in FIG. 4B. Wavelets 516-519 record the primary reflected wavefield as represented by dashed-line ray path 411 in FIG. 4B. Wavelets 520-523 record the downgoing reflected wavefield as represented by dashed-line ray path 414 in FIG. 4B. Wavelets 524-527 record the subsurface multiple wavefield as represented by dotted-line ray path 405 in FIG. 4C. Wavelets 528-531 record the free-surface multiple wavefield as represented by dot-dashed-line ray path 404 in FIG. 4C, In FIG. 5, the events are identified as upgoing and downgoing wavefields as represented by the upgoing and downgoing ray paths that reach the receiver 402 in FIGS. 4B and 4C.

Random Sweeps

A marine vibrator receives a signal from a seismic source control located on board the survey vessel. The signal drives the marine vibrator to produce acoustic energy in the form of an oscillating pressure wavefield called a "sweep." The signal can be a pre-defined signal or a pre-generated signal. The frequency of oscillation of a sweep is determined by the frequency of oscillation of the signal input to the marine vibrator. The frequency of oscillation of a sweep is called the sweep signature or simply the "signature." A sinusoidal signal sent to a marine vibrator creates a sweep with a sinusoidal frequency of oscillation and a corresponding signature that may be mathematically modeled by the following expression:

$$s(t,\vec{x}_{sj}) = a(t)\sin[2\pi\theta(t)t] \quad (2)$$

where a(t) represents a time-dependent amplitude of the sweep;

θ(t) represents a time-dependent frequency of the sweep; and t is time.

The amplitude a(t) has units of pressure. The sinusoidal term, sin[2πθ(t)t], models oscillations in a sweep over time. The frequency θ(t) has units of inverse time and is equivalent to the actual vibrational frequency of the marine vibrator and the signal sent to the marine vibrator. The quantity 2πθ(t) is a time-dependent angular frequency with units of radians per unit of time. A sweep is generated over a time period called a sweep interval. The frequency of a sweep may be mathematically modeled by the following expression:

$$\theta(t) = f_0 + \left(\frac{df}{dt}\right)t \quad (3)$$

where $f_0$ is an initial frequency of the sweep emitted from a marine vibrator at the start of a sweep; and df/dt is the rate at which the frequency of the sweep changes over time.

A marine vibrator may be operated to generate a linear sweep with a frequency that continuously increases (i.e., an upsweep with θ(t)>0) or continuously decreases (i.e., a downsweep with θ(t)<0) for the duration of the sweep. A sweep begins with the initial frequency $f_0$ at the start of the sweep and stops with a final frequency denoted by $f_1$ (i.e., $f_1 = f_0 + (df/dt)T$). Marine vibrators often emit linear sweeps (i.e., df/dt is constant) with frequencies that linearly increase (or decrease) for the duration of the sweep.

Figure 6A:
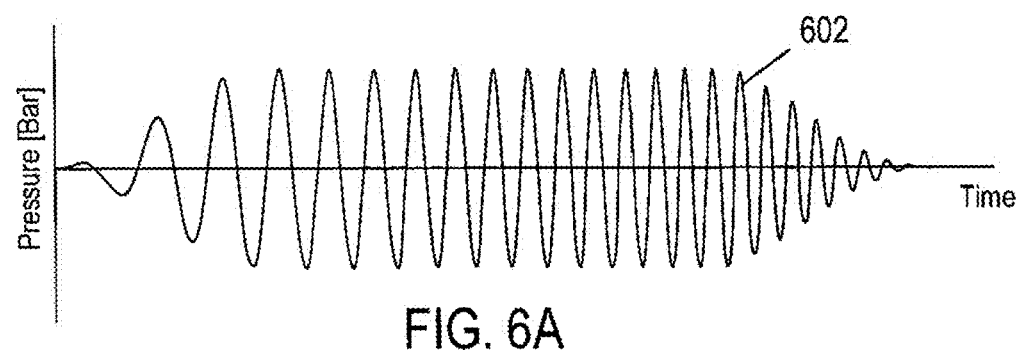
FIG. 6A shows a plot of an example signature of a linear sweep.

FIG. 6A shows a plot of an example signature of a linear sweep. Oscillating curve 602 represents oscillations in a pressure wavefield of the linear sweep. In this example, the frequency of oscillation increases over the sweep interval.

Marine vibrators may also be operated to generate each sweep with a particular phase relative to other sweeps. A parameter, ϕ, represents a phase angle with units of radians, where −π<ϕ≤π. The signature of a sweep generated with a phase shift may be mathematically modeled as follows:

$$s(t) = a(t)\sin[2\pi\theta(t)t \pm \phi] \quad (4)$$

The phase ϕ shifts angular dependence of the sweep. A positive valued phase, +ϕ, shifts the angle of the signature forward in the angle domain. A negative valued phase, −ϕ, shifts the angle of the signature backward in the angle domain. Seismic source control may drive each marine vibrator to generate a different random linear sweep by sending each marine vibrator a sinusoidal signal within a random duration sweep interval and/or with a random initial phase.

Alternatively, a seismic source control generates a pseudo-random sweep by sending a pseudo-random signal to one of the marine vibrators. The pseudo-random signal sent to each marine vibrator is different. As a result, each marine vibrator generates a different pseudo-random sweep with a different associated pseudo-random signature. The oscillating pressure wavefield of a pseudo-random sweep has a random frequency of oscillation for the duration of the sweep and is characteristic of random noise.

Figure 6B:
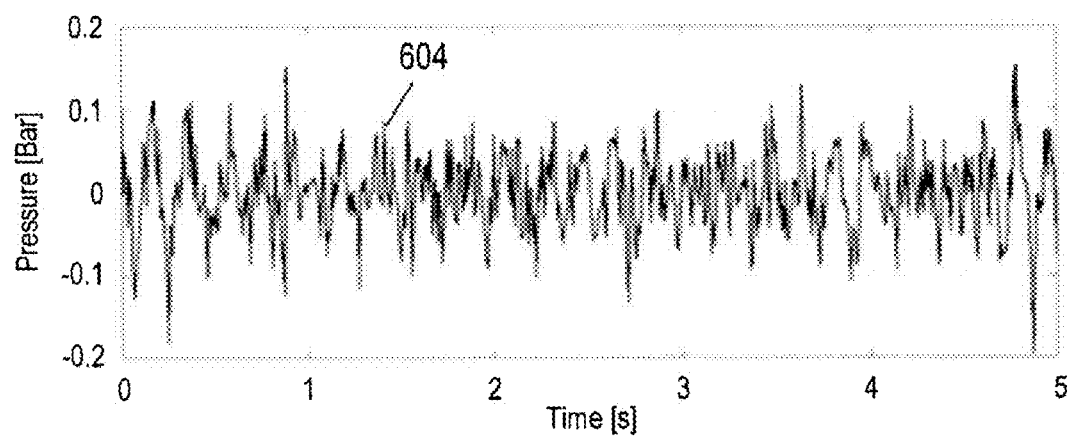
FIG. 6B shows a five second portion of an example signature of a pseudo-random sweep.
Figure 6C:
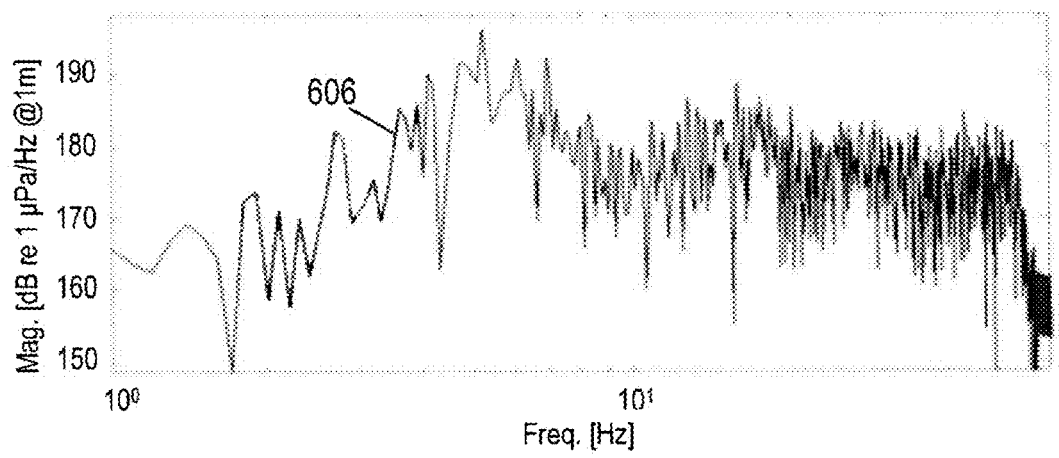
FIG. 6C shows an amplitude spectrum of the pseudo-random signature shown in FIG. 6B.

FIG. 6B shows a five second portion of a signature of a pseudo-random sweep generated over a 3300 second sweep interval. The signature of the pseudo-random sweep is represented by oscillating curve 604 that exhibits a random amplitude and frequency of oscillation over the five second interval, which are characteristics of random noise. FIG. 6C shows an amplitude spectrum of the pseudo-random signature shown in FIG. 6B measured at about 1 meter from the marine vibrator. The amplitude spectrum is represented by curve 606, which reveals that the amplitude of a pseudo-random sweep varies over a wide range of frequencies, ranging from about 1 Hz to as high as about 60 Hz.

As used herein, the term "random sweep" refers to a random linear sweep and a pseudo-random sweep. Vibrational sources may be used in marine surveys in which seismic data is recorded in shot records. Recording seismic data in a shot record typically begins at the start of a sweep and continues recording for a period of time after the sweep has stopped. For example, sweeps are often generated by activating a marine vibrator in sweep intervals of about 5 to about 7 seconds or longer. A marine vibrator may generate a sweep for 5 seconds while seismic data is being recorded followed by an extra recording time of 2.5 seconds. Since recording began at the start of the sweep, the total recording length for the shot record is 7.5 seconds. Alternatively, marine vibrators may be used in continuous recording surveys. For example, one or more marine vibrators may be continuously and/or contemporaneously activated to generate a continuous pseudo-random sweep along a sail line while seismic data is continuously recorded. Alternatively, random linear sweeps may be generated one after another or contemporaneously with random initial phases and/or sweep durations along a sail line while seismic data is continuously recorded.

Seismic Imaging

Figure 7:
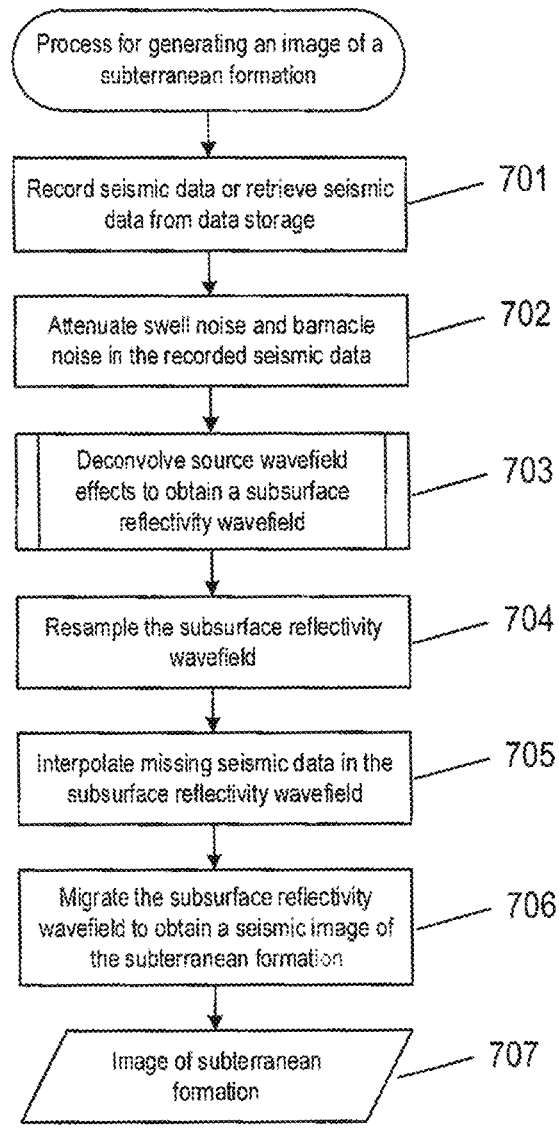
FIG. 7 is a flow diagram of a process for generating an image of a subterranean formation from recorded seismic data.

FIG. 7 is a flow diagram of a process for generating an image of a subterranean formation from seismic data recorded during a marine seismic survey using a vibrational source that generates random sweeps. Each block represents different modules of computer implemented machine-readable instructions stored in one or more data-storage devices and executed using one or more processors of a computer system. It should be noted that the series of components represented in FIG. 7 is not an exhaustive list of the modules that may be used to compute an image of a subterranean formation. Computational processes may include additional modules or computer-implemented routines or certain modules may be omitted or placed in a different ordering, depending on, for example, how the seismic data is collected, conditions under which the seismic data is collected, and depth of the body of water above the subterranean formation.

In FIG. 7, block 701 represents obtaining seismic data recorded in a marine survey with random sweeps generated by one or more marine vibrators as described above. The seismic data may be pressure and vertical velocity wavefields recorded using receivers configured with collocated pressure and particle motion sensors as described above with reference to FIG. 3. In block 702, attenuation of swell noise and barnacle noise in the recorded seismic data is performed. In block 703, a "deconvolve source wavefield effects to obtain a subsurface reflectivity wavefield" procedure is performed. An example implementation of the "deconvolve source wavefield effects to obtain a subsurface reflectivity wavefield" procedure is described below with reference to FIG. 14. The resulting subsurface reflectivity wavefield is an upgoing pressure wavefield that has been corrected for source wavefield effects associated with one or more random sweeps. In block 704, traces of the subsurface reflectivity wavefield data, also called the "subsurface reflectivity wavefield, may be resampled. For example, a gather formed from traces of the subsurface reflectivity wavefield may be resampled to have the same sampling rate of 1 data point every 4 milliseconds. Because the receivers undulate during seismic data recording, the inline and crossline receiver locations of the traces may be irregularly spaced during recording of the seismic data. In block 705, interpolation may be used to replace corrupted traces or fill in traces of missing subsurface reflectivity data, such as interpolating traces in the crossline direction where receivers are spaced farther apart than in the inline direction. In block 706, migration is applied to the gathers of subsurface reflectivity wavefield to place seismic reflections into correct spatial or temporal reflector positions. Migration may be performed in the space-time coordinate system (i.e., time migration) or Cartesian coordinate system (i.e., depth migration) to obtain an image of the subterranean formation 707. The image of the subterranean formation may be displayed with an electronic display for viewing. The electronic display may be a monitor, a television, a projector that projects the image onto a screen, or any other display device. The resulting image provides a high-resolution visual presentation of the subterranean formation without distortions and contamination from the source wavefield effects and receiver ghosts.

Deconvolve a Source Wavefield from an Upgoing Pressure Wavefield to Obtain Subsurface Reflectivity Processes and systems for deconvolving a source wavefield created by random sweeps to obtain subsurface reflectivity in step 704 of FIG. 7 are described. The following integral equation relates an up-going pressure wavefield to the source wavefield and a subsurface reflectivity wavefield in the space-frequency domain:

$$\sum_{j=1}^{N_s} P_{up}(\vec{x}_r, z_r, \omega \mid \vec{x}_{sj}, z_{sj}) S_d(\omega) = \qquad (5a)$$

$$-2\rho \int_{-\infty}^{\infty} \sum_{j=1}^{N_s} A_z^{dn}(\vec{x}, z, \omega \mid \vec{x}_{sj}, z_{sj}) R(\vec{x}_r, z_r, \omega \mid \vec{x}, z) d\vec{x}$$

where
ρ is the density of the body of water;
ω is the angular frequency;
$\vec{x} = (x, y)$ is a horizontal coordinate location on a virtual source/receiver level;
z is the depth of the virtual source/receiver level located between the depth of the vibrational source and the depth of the receiver (i.e., $z_r < z < z_{sj}$):
$N_s$ is the number of marine vibrators activated to create random sweeps;
$S_d(\omega)$ is a desired source signature (e.g., $S_d(\omega)$ may be a band-limited spike);
$\sum_{j=1}^{N_s} P_{up}(\vec{x}_r, z_r, \omega \mid \vec{x}_{sj}, z_{sj})$ is the upgoing pressure wavefield created by activating $N_s$ marine vibrators;
$\sum_{j=1}^{N_s} A_z^{dn}(\vec{x}_r, z, \omega \mid \vec{x}_{sj}, z_{sj})$ is the downgoing vertical acceleration wavefield produced by the $N_s$ activated marine vibrators; and
$R(\vec{x}_r, z_r, \omega \mid \vec{x}, z)$ is the subsurface reflectivity wavefield with attenuated source wavefield effects, such as attenuated source-motion, directivity, source ghost, and is designatured.

The summations over the number of activated marine vibrators $N_s$ represent blended seismic data. For example, if two or more marine vibrators have been contemporaneously activated to generate two blended random sweeps, then $\sum_{j=1}^{N_s} P_{up}(\vec{x}_r, z_r, \omega \mid \vec{x}_{sj}, z_{sj})$ represents a blended upgoing pressure wavefield and $\sum_{j=1}^{N_s} A_z^{dn}(\vec{x}, z, \omega \mid \vec{x}_{sj}, z_{sj})$ represents a blended downgoing vertical acceleration wavefield that comprises the source wavefield effects. In other words, the downgoing vertical acceleration wavefield comprises the random sweeps generated by the $N_s$ marine vibrators, source ghost reflections of the random sweeps from the free surface, source motion effects, such as Doppler effects, and directivity of the source wavefield, which varies in amplitude with angle. The expression in Equation (5a) does not include any assumptions about the source wavefield and the subsurface reflectivity wavefield. The following discussion describes obtaining the subsurface reflectivity wavefield from the upgoing pressure wavefield, the downgoing vertical acceleration wavefield, and the source signature. Obtaining the upgoing pressure wavefield in Equation (5a) is described below in a separate subsection titled "Determining the Upgoing Pressure Wavefield." Obtaining the downgoing pressure wavefield in Equation (5a) is described below in a separate subsection titled "Determining the Downgoing Vertical Acceleration Wavefield."

Figure 8A:
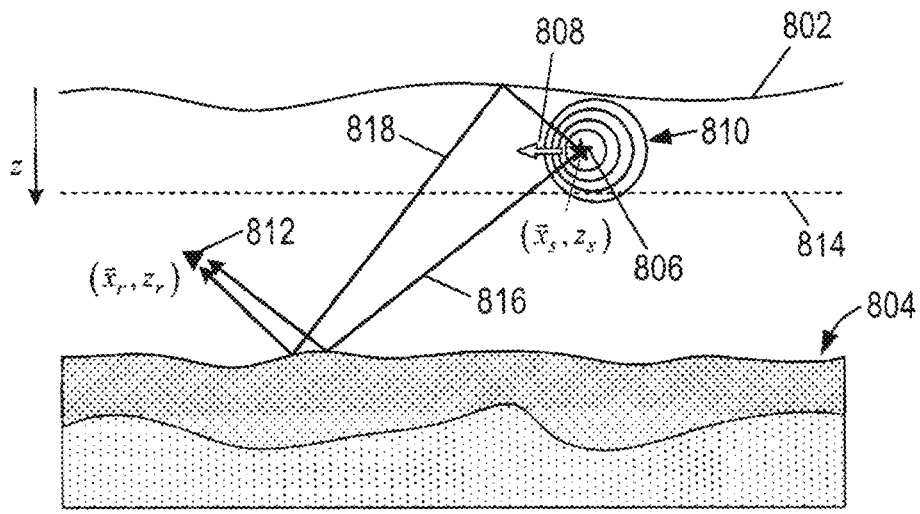
FIGS. 8A-8C show a depth-plane view of ray paths that represent paths of wavefields.
Figure 8B:
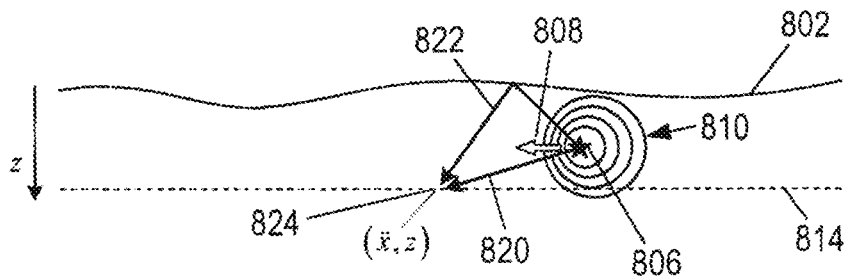
Figure 8C:
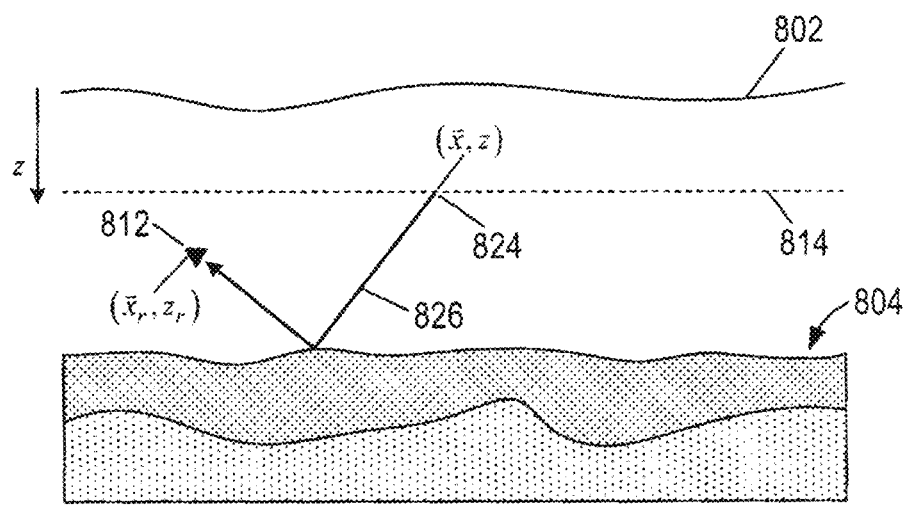

FIGS. 8A-8C show a depth-plane view of ray paths that represent paths of the wavefields in Equation (5a). In FIGS. 8A-8C, curve 802 represents the free surface of a body of water located above a subterranean formation 804. A vibrational source 806 is depicted as moving within the body of water in a direction indicated by directional arrow 808. Shifted circles 810 represent a cross-sectional view of a Doppler shifted source wavefield emitted from the vibrational source 806. A receiver 812 comprising pressure and particle motion sensors and is located deeper within the body of water than the vibrational source 806. Dashed line 814 represents a virtual source/receiver level, denoted by $V_{sr}$, that extends in the xy-plane parallel to the free surface 802 and is located at depth, z, between the depth, $z_s$, of the vibrational source 806 and the depth, $z_r$, of the receiver 812. In FIG. 8A, ray paths 816 and 818 represent portions of an upgoing pressure wavefield $\Sigma_{j=1}^{N_s} P_{up}(\vec{x}_r, z_r, \omega | \vec{x}_{sj}, z_{sj})$ that reach the receiver 812. Ray path 816 represents a portion of the upgoing reflection that travels from the subterranean formation directly to the receiver 812. Ray path 818 represents a portion of the upgoing pressure wavefield created by a downgoing reflection from the free surface 802 followed by an upgoing reflection from the subterranean formation t the receiver 812. In FIG. 8B, the downgoing vertical acceleration wavefield $\Sigma_{j=1}^{N_s} A_z^{dn}(\vec{x}, z, \omega | \vec{x}_{sj}, z_{sj})$ is represented by ray paths 820 and 822 and represents the source wavefield effects that reach the virtual source/receiver level 814. Ray path 820 represents a portion of the direct incident downgoing vertical velocity wavefield that travels directly to a virtual receiver at a location $(\vec{x}, z)$ 824 on the virtual source/receiver level $V_{sr}$ 814. Ray path 822 represents a portion of the downgoing vertical acceleration wavefield that is first reflected from the free surface 802 before reaching the virtual receiver at the location 824. In FIG. 8C, the subsurface reflectivity wavefield $R(\vec{x}_r, z_r, \omega | \vec{x}, z)$ is represented by a ray path 826 of a downgoing pressure wavefield created by a virtual source at the location $(\vec{x}, z)$ 824 followed by a pressure wavefield reflected upward from the subterranean formation 804 to the receiver 812. The subsurface reflectivity wavefield $r(\vec{x}_r, z_r, \omega | \vec{x}, z)$ in Equation (5a) is an up-going pressure wavefield at the receiver 812 (i.e., receiver deghosted) with attenuated source wavefield effects.

The integral of Equation (5a) may be discretized with respect to a finite number of coordinate locations in the virtual source/receiver level:

$$\sum_{j=1}^{N_s} P_{up}(\vec{x}_r, z_r, \omega | \vec{x}_{sj}, z_{sj}) S_d(\omega) = \quad (5b)$$

$$-2\rho \sum_{\vec{x}_k \in V_{sr}} \sum_{j=1}^{N_s} A_z^{dn}(\vec{x}_k, z, \omega | \vec{x}_{sj}, z_{sj}) R(\vec{x}_r, z_r, \omega | \vec{x}_k, z) \Delta \vec{x}$$

where $\vec{x}_k \in V_{sr}$ represents a set of N coordinate locations $(x_k, y_k)$ on the virtual source/receiver level $V_{sr}$;

k=1, ..., N; and $\Delta \vec{x} = \Delta x \Delta y$ with $\Delta x$ and $\Delta y$ representing distances between locations on the virtual source/receiver level in the x- and y-directions, respectively.

Note that Equation (5b) relates a product of the blended upgoing pressure wavefield recorded at a receiver location and the source signature to a summation of a product of the blended downgoing vertical velocity wavefield over N locations in the virtual source/receiver level and the subsurface reflectivity wavefield at the receiver location.

Figure 9B:
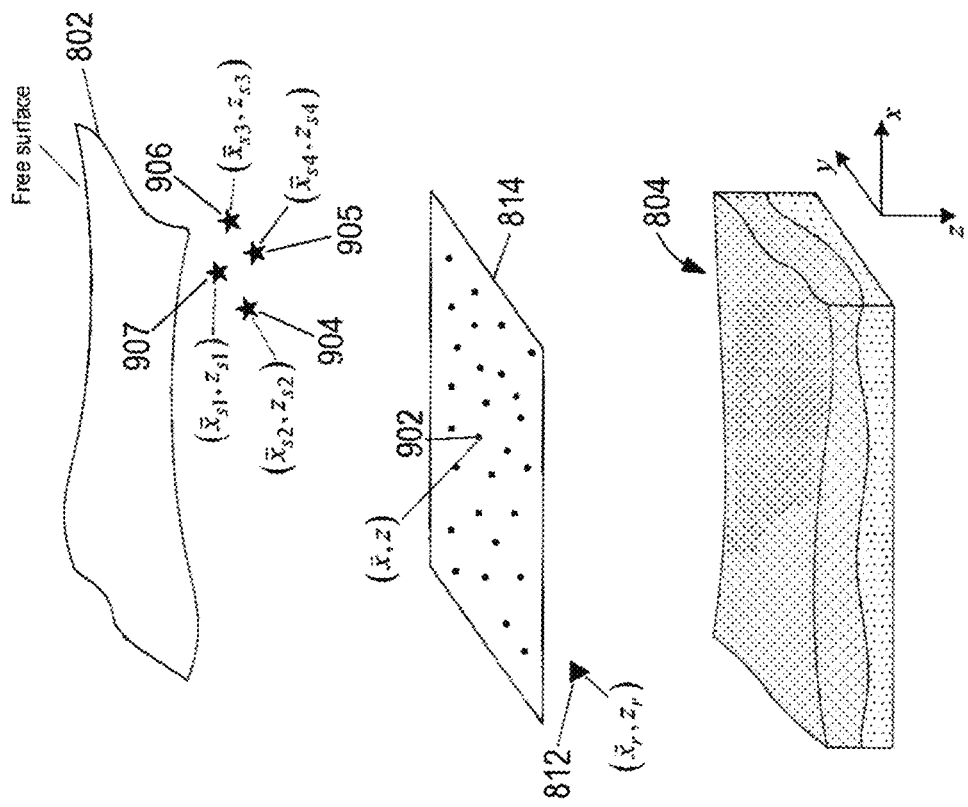
FIG. 9B shows an isometric view of a virtual source/receiver level located between four marine vibrators and a receiver.
Figure 9A:
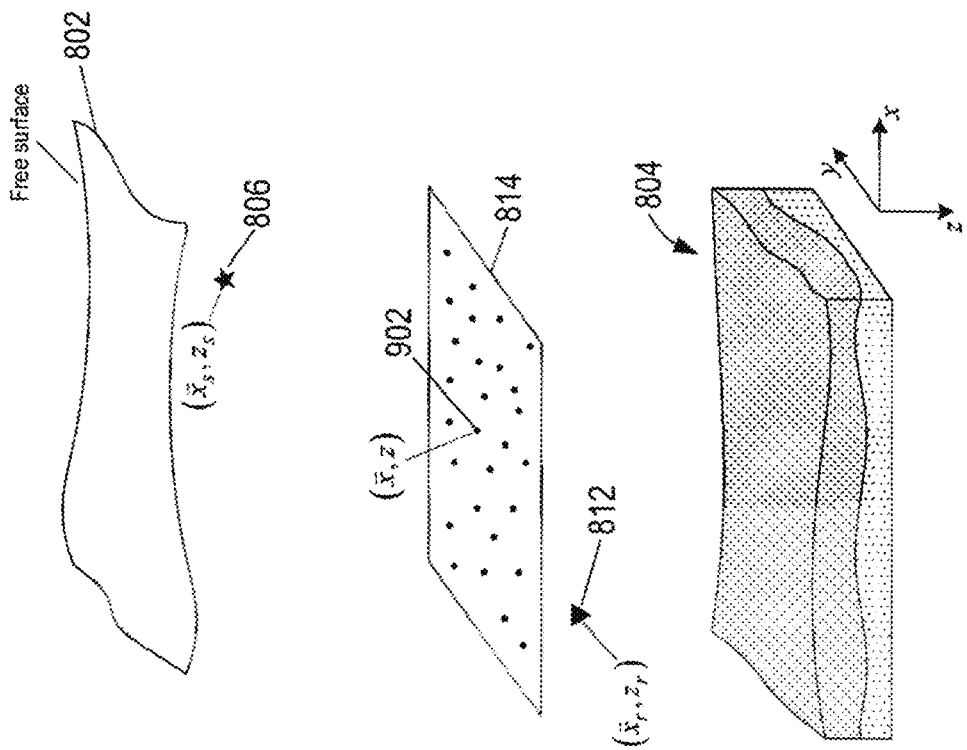
FIG. 9A shows an isometric view of a virtual source/receiver level located between a vibrational source and a receiver.

FIG. 9A shows an isometric view of the virtual source/receiver level 814 located at a depth between the depth of the vibrational source 806 and the depth of the receiver 812. Points, such as point 902, represent discrete coordinate locations on the virtual source/receiver level 814. FIG. 9B shows an isometric view of the virtual source/receiver level 814 located at a depth between the depths of an array of four marine vibrators and the depth of a receiver. In this illustration, the vibrational source 806 comprise four marine vibrators 904-907 at coordinate locations $\vec{x}_{s1}$, $\vec{x}_{s2}$, $\vec{x}_{s3}$, and $\vec{x}_{s4}$, respectively.

The discretized integral in Equation (5b) may be presented as a linear system of equations:

$$p_{up} s_d = -2\rho \Delta \vec{x} \, \vec{a}_z^{dn} \vec{r} \quad (6a)$$

where $\underline{p}_{up} = \Sigma_{j=1}^{N_s} P_{up}(\vec{x}_r, z_r, \omega | \vec{x}_{sj}, z_{sj}) \in \mathbb{C}$;

$\vec{a}_z^{dn} \in \mathbb{C}^N$;

$\vec{r} \in \mathbb{C}^N$; and overbar denotes a matrix.

FIG. 10 shows an expanded representation of the matrices of Equation (6a). Elements of the downgoing vertical acceleration vector $\vec{a}_z^{dn}$ are represented as a 1×N row matrix 1002. Elements of the subsurface reflective vector $\vec{r}$ are represented as an N×1 column matrix 1004. Elements of the vector $\vec{a}_z^{dn}$ 1002 are denoted by $$a_{z,k}^{dn} = \sum_{j=1}^{N_s} A_z^{dn}(\vec{x}_k, z, \omega | \vec{x}_{sj}, z_{sj}) \quad (6b)$$

where k=1, ..., N.

Multiplying both sides of Equation (6a) by the complex conjugate transpose of the downgoing vertical acceleration vector, denoted by $[\vec{a}_z^{dn}]^H$, gives $$\bar{c} s_d = -2\rho \Delta \vec{x} \, \bar{\Gamma} \vec{r} \quad (7a)$$

where $\bar{c} = [\vec{a}_z^{dn}]^H p_{up}$; and
$\bar{\Gamma} = [\vec{a}_z^{dn}]^H \vec{a}_z^{dn}$.

FIG. 11 shows an expanded representation of the vector $\bar{c}$ of Equation (7a). The complex conjugate transpose of the downgoing vertical acceleration vector $[\vec{a}_z^{dn}]^H$ is an N×1 vector represented by a column matrix 1102 with complex conjugate of the downgoing vertical acceleration elements denoted by $$[a_{z,k}^{dn}]^H = \sum_{j=1}^{N_s} A_z^{dn*}(\vec{x}_k, z, \omega | \vec{x}_{sj}, z_{sj}) \quad (7b)$$

where "*" denotes complex conjugate.

FIG. 12 shows an expanded representation of the N×N matrix $\Gamma$ of Equation (7a). Elements of the matrix $\Gamma$ are represented by $$\Gamma_{ki}=[a_{z,k}^{dn}]^H a_{z,i}^{dn} \quad (8)$$

where i=1, ..., N.

Off-diagonal elements of the matrix $\Gamma$ in Equation (7a) are cross-correlations of the downgoing vertical acceleration wavefield, $\Sigma_{j=1}^{N_s} A_z^{dn*}(\vec{x}_k, z, \omega | \vec{x}_{sj}, z_{sj})$, at virtual source/receiver location ($\vec{x}_k$, z) with the downgoing vertical acceleration wavefield, $\Sigma_{j=1}^{N_s} A_z^{dn}(\vec{x}_i, z, \omega | \vec{x}_{sj}, z_{sj})$, at the virtual source/receiver location ($\vec{x}_i$, z). The diagonal elements of the matrix $\Gamma$ are auto-correlations of the downgoing vertical acceleration wavefield at each virtual source/receiver location of the virtual source/receiver level. Because each of the marine vibrators generates a different random sweep, the signatures of the downgoing vertical acceleration wavefield at each of the different virtual source/receiver locations exhibit characteristics of random noise. As a result, cross-correlation of the downgoing vertical acceleration wavefields at the different virtual source/receiver locations are zero-valued off-diagonal elements of the matrix $\Gamma$. In other words, the different random sweeps are orthogonal and cross-correlations of the corresponding random signatures are zero. By contrast, auto-correlations of the downgoing vertical acceleration wavefield at the different virtual source/receiver locations are non-zero diagonal elements of the matrix $\Gamma$. The matrix $\Gamma$ in Equation (7a) is the auto-correlation matrix of the downgoing vertical acceleration wavefield with elements represented by $$\Gamma_{ki} = \delta_{ki} \{[a_{z,k}^{dn}]^H a_{z,i}^{dn}\} \quad (9)$$

where $$\delta_{ki} = \begin{cases} 0 & k \neq j \\ 1 & k = j \end{cases}$$

$[a_{z,k}^{dn}]^H a_{z,k}^{dn}$ is the power of the downgoing vertical acceleration wavefield at the virtual source/receiver location ($\vec{x}_k$, z).

Because the power of the downgoing vertical acceleration wavefield at each virtual source/receiver locations are the same, the auto-correlation matrix of the downgoing vertical acceleration wavefield matrix $\vec{\Gamma}$ may be rewritten as $$\vec{\Gamma} = |\bar{a}_z^{dn}|^2 \bar{I} \quad (10)$$

where $\bar{I}$ is the N×N identity matrix; and $|\bar{a}_z^{dn}|^2$ is the square of the amplitude spectrum (i.e., power) of the downgoing vertical acceleration traces, which is the same for each of virtual source/receiver locations. The square of the amplitude spectrum of the downgoing vertical acceleration traces, $|\bar{a}_z^{dn}|^2$, is the power of the downgoing vertical acceleration wavefield generated by the vibrational source, which is the same for each of the virtual source/receiver locations. The square of the amplitude spectrum | $\bar{a}_z^{dn}|^2$ of the downgoing vertical acceleration wavefield contains the power of the source wavefield, source ghost, directivity, and signature of the random sweeps generated by the $N_s$ contemporaneously activated marine vibrators.

Substituting Equation (10) into Equation (7a) and solving for the subsurface reflectively vector $\bar{r}$ gives $$\bar{r} = \frac{\bar{c}s_d}{2\rho \Delta x |\bar{a}_z^{dn}|^2 + \varepsilon} \quad (11)$$

where $\varepsilon$ is a regularization parameter.

Elements of the subsurface reflectivity vector are given by $$R(\hat{x}_r, z_r, \omega \mid \hat{x}_k, z) = \frac{s_d P_{up}[a_{z,k}^{dn}]^H}{2\rho\Delta x(|\bar{a}_z^{dn}|^2 + \epsilon)} \quad (12)$$

The downgoing vertical acceleration wavefield represents the source wavefield effects, such as source-motion, directivity, source ghost, and the source wavefield signature. Equations (11) and (12) deconvolve the downgoing vertical acceleration wavefield from the upgoing pressure wavefield to obtain the subsurface reflectivity in the space-frequency domain. The subsurface reflectivity, $R(\vec{x}_r, z_r, \omega | \vec{x}_k, z)$, may be transformed to the space-time domain using an inverse fast or discrete Fourier transform to obtain a trace of the subsurface reflectivity, denoted by $R(\vec{x}_r, z_r, t | \vec{x}_k, z)$. The above described operations may be performed for each trace of recorded seismic data to obtain traces of the subsurface reflectivity wavefield. Each trace of the subsurface reflectivity wavefield is corrected for source wavefield effects, such as source-motion, directivity, and source ghost, and is designatured.

Traces of the subsurface reflectivity wavefield may be selected to form gathers in different domains, such as the common-shot domain or the common-receiver domain. The gathers may be further processed according to steps 704-706 of FIG. 7 to obtain high-resolution images of the subterranean formation without distortions and contamination from source wavefield effects created by moving, contemporaneously activated marine vibrators that generate random sweeps with orthogonal signatures.

Determining the Upgoing Pressure Wavefield

The pressure wavefield created by contemporaneously activating $N_s$ marine vibrators and measured at a receiver location is transformed using fast-Fourier transform ("FFT") or an inverse discrete Fourier transform ("DFT") from the space-time domain to the wavenumber-frequency domain as follows:

$$\sum_{j=1}^{N_s} p(\hat{x}_r, z_r, t | \hat{x}_{sj}, z_{sj}) \to \sum_{j=1}^{N_s} P(k_x, k_y, \omega | \hat{x}_{sj}, z_{sj}) \quad (13)$$

where $\Sigma_{j=1}^{N_s} p(\vec{x}_r, z_r, t | \vec{x}_{sj}, z_{sj})$ is a trace of pressure wavefield data, also called the pressure wavefield, generated by a pressure sensor at the receiver location ($\vec{x}_r$, $z_r$);

$\Sigma_{j=1}^{N_s} P(k_x, k_y, \omega | \vec{x}_{sj}, z_{sj})$ is the pressure wavefield spectrum of the pressure wavefield created by the $N_s$ marine vibrators and measured at the pressure sensor; and $k_x$ and $k_y$ are x- and y-direction horizontal wavenumber numbers, respectively.

The vertical velocity wavefield created by contemporaneously activating $N_s$ marine vibrators and measured at the receiver location ($\vec{x}_r$, $z_r$) by a collocated particle velocity sensor is also transformed from the space-time domain to the wavenumber-frequency domain as follows:

$$\sum_{j=1}^{N_s} v_z(\vec{x}_r, z_r, t \mid \vec{x}_{sj}, z_{sj}) \rightarrow \sum_{j=1}^{N_s} V_z(k_x, k_y, \omega \mid \vec{x}_{sj}, z_{sj}) \quad (14)$$

where $\sum_{j=1}^{N_s} v_z(\vec{x}_r, z_r, t \mid \vec{x}_{sj}, z_{sj})$ is a trace of vertical velocity wavefield data, also called the vertical velocity wavefield, generated by a particle motion sensor at the receiver location $(\vec{x}_r, z_r)$; and $\sum_{j=1}^{N_s} V_z(k_x, k_y, \omega \mid \vec{x}_{sj}, z_{sj})$ is the vertical velocity wavefield spectrum of the vertical velocity wavefield created by the $N_s$ marine vibrators and measured at the particle motion sensor.

The spectrum of the upgoing pressure wavefield is given by $$\sum_{j=1}^{N_s} P_{up}(k_x, k_y, \omega \mid \vec{x}_{sj}, z_{sj}) = \quad (15)$$

$$\frac{1}{2}\left[\sum_{j=1}^{N_s} P(k_x, k_y, \omega \mid \vec{x}_{sj}, z_{sj}) - \frac{\omega \rho}{k_z} \sum_{j=1}^{N_s} V_z(k_x, k_y, \omega \mid \vec{x}_{sj}, z_{sj})\right]$$

where $k_z = \sqrt{\left(\frac{\omega}{c}\right)^2 - k_x^2 - k_y^2}$ is the vertical wavenumber; and $c$ is the speed of sound in water.

The spectrum of the upgoing pressure wavefield in Equation (15) is receiver deghosted. In other words, the upgoing pressure wavefield obtained using Equation (15) does not include reflections from the free surface and considered receiver ghosted. The upgoing pressure wavefield in Equation (5a) above may be obtained by reverse transforming spectrum of the upgoing pressure wavefield in Equation (15) from the wavenumber-frequency domain to the space-frequency domain using an inverse FFT or an inverse DFT:

$$\sum_{j=1}^{N_s} P_{up}(k_x, k_y, \omega \mid \vec{x}_{sj}, z_{sj}) \rightarrow \sum_{j=1}^{N_s} P_{up}(\vec{x}_r, z_r, \omega \mid \vec{x}_{sj}, z_{sj}) \quad (16)$$

Determining the Downgoing Vertical Acceleration Wavefield

The downgoing vertical acceleration wavefield may be determined from time derivatives of a direct incident downgoing vertical velocity wavefield. In one implementation, the direct incident downgoing vertical velocity wavefield may be obtained from near field pressure and vertical velocity wavefield measurements of the source wavefield generated by the $N_s$ moving marine vibrators using one or more streamers located within the near field of the marine vibrators. Each streamer may include collocated pressure and particle motion sensors that measure direct incident downgoing pressure and vertical velocity wavefields, respectively, emitted in the near field from the moving marine vibrators.

Figure 13:
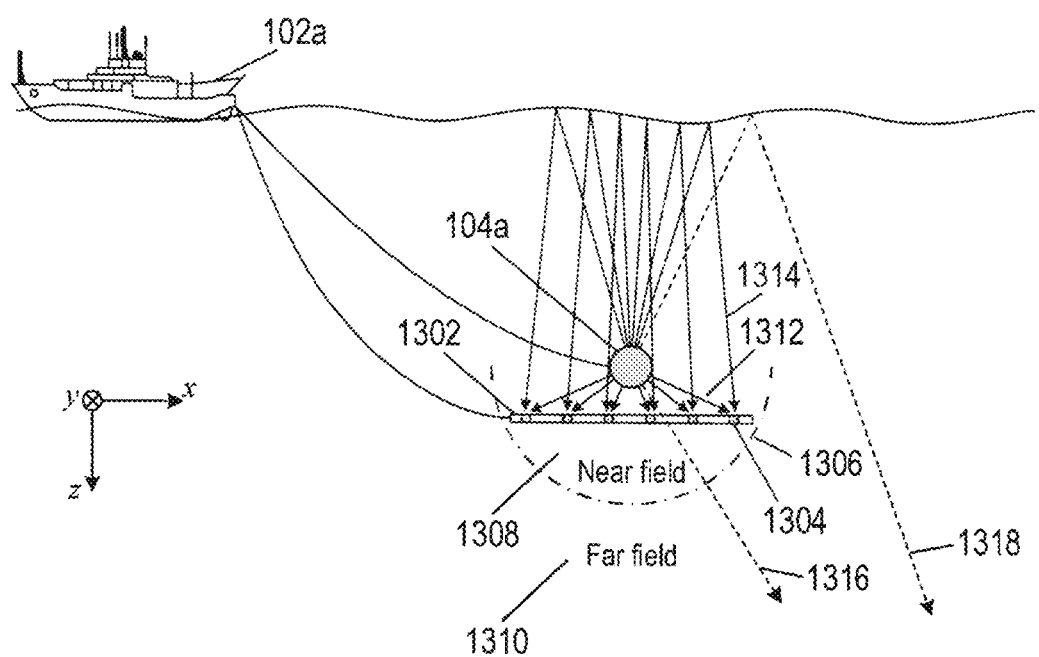
FIG. 13 shows a side-elevation view of a streamer of a source acquisition surface towed within the near field of a moving vibrational source.

FIG. 13 shows a side-elevation view of a streamer 1302 of a source acquisition surface towed within the near field of the moving vibrational source 104a. The source acquisition surface comprises one or more streamers. Each streamer comprises spaced apart collocated pressure and particle motion sensors represented by shaded boxes, such as shaded box 1304. Curved dot-dashed line 1306 represents a notional boundary between the near field and the far field of the source 104a. The near field 1308 corresponds to a region close to the source 104a where the signature of the source wavefield varies due to overlapping signatures of separate sweeps generate by the marine vibrators of the vibrational source 104a. By contrast, the far field 1310 represents a region away from the vibrational source 104a where the signature of the source wavefield is stable with increasing distance from the vibrational source 104a. The notional boundary is located at about $2d^2/\lambda$ from the center of the vibrational source 104, where d is a length dimension of the vibrational source 104a, and $\lambda$ is a wavelength of the source wavefield generated by the vibrational source 104. Solid line ray paths, such as ray paths 1312 and 1314, represent portions of source wavefields that reach the receivers located along the streamer 1302. For example, ray path 1312 represents a portion of the source wavefield emitted from the moving vibrational source 104a that travels directly to the receiver 1304. Ray path 1314 represents a source ghost created by a portion of the source wavefield emitted from the vibrational source 104 that travels upward to the free surface and is reflected downward to the receiver 1304. The pressure and vertical velocity wavefields measured by the collocated pressure and particle motion sensors are called direct incident pressure and velocity wavefields comprising the direct source wavefield and the source ghost as represented by ray paths 1312 and 1314. Dash line ray paths 1316 and 1318 represent portions of the source wavefield that travel beyond the streamer 1302 to interact with the subterranean formation.

The streamers may undulate due to water currents and weather conditions. The streamers may be curved to form a hemispherical-shaped, or curved, source acquisition surface located below and within the near field of vibrational source 104a. The curved shape of the source acquisition surface may enable the particle motion sensors to measure the radially expanding source wavefield normal to the wavefront of the source wavefield.

The direct incident pressure wavefield recorded by pressure sensors of the source acquisition surface of FIG. 13 is denoted by $$\left\{\sum_{j=1}^{N_s} p_{Inc}(\vec{x}_{rq}, z_{rq}, t \mid \vec{x}_{sj}, z_{sj})\right\}_{q=1}^{Q} \quad (17a)$$

where

Q is the number of receivers of the source acquisition surface; and $\vec{x}_{rq}$ is the coordinate location of a q-th receiver of the source acquisition surface.

The direct incident vertical velocity wavefield obtained using the source acquisition surface of FIG. 13 is denoted by $$\left\{\sum_{j=1}^{N_s} v_{z,Inc}(\vec{x}_{rq}, z_{rq}, t \mid \vec{x}_{sj}, z_{sj})\right\}_{q=1}^{Q} \quad (17b)$$

The direct incident pressure wavefield and the downgoing vertical velocity wavefield may be transformed from the space-time domain to the space-frequency domain using an FFT or a DFT:

$$\sum_{j=1}^{N_s} p_{Inc}(\vec{x}_{rq}, z_{rq}, t \mid \vec{x}_{sj}, z_{sj}) \to \sum_{j=1}^{N_s} P_{Inc}(\vec{x}_{rq}, z_{rq}, \omega \mid \vec{x}_{sj}, z_{sj})$$

$$\sum_{j=1}^{N_s} v_{z,Inc}(\vec{x}_{rq}, z_{rq}, t \mid \vec{x}_{sj}, z_{sj}) \to \sum_{j=1}^{N_s} V_{z,Inc}(\vec{x}_{rq}, z_{rq}, \omega \mid \vec{x}_{sj}, z_{sj})$$

The direct incident vertical velocity wavefield may be extrapolated to the depth z of the virtual source/receiver level, $V_{sr}$, using Kirchhoff-Helmholtz integral extrapolation represented by:

$$\int_{V_{sr}} d\vec{x} \left[ G(\vec{x}, z, \vec{x}_{sj}, z_{sj}) i\omega\rho \sum_{j=1}^{N_s} V_z^{dn}(\vec{x}, z, \omega \mid \vec{x}_{sj}, z_{sj}) \right] = \quad (18)$$

$$\int_{S_r} dS\vec{n} \cdot \left[ \sum_{j=1}^{N_s} P_{Inc}(\vec{x}_{rq}, z_{rq}, \omega \mid \vec{x}_{sj}, z_{sj}) \nabla G(\vec{x}, z, \vec{x}_{sj}, z_{sj}) - \right.$$

$$\left. G(\vec{x}, z, \vec{x}_{sj}, z_{sj}) i\omega\rho \sum_{j=1}^{N_s} V_{z,Inc}(\vec{x}_{rq}, z_{rq}, \omega \mid \vec{x}_{sj}, z_{sj}) \right]$$

where $S_r$ represents the source acquisition surface; and

G is a free-space Green's function.

The unknown quantity in Equation (18) is the downgoing vertical velocity wavefield $\sum_{j=1}^{N_s} V_z^{dn}(\vec{x}, z, \omega \mid \vec{x}_{sj}, z_{sj})$ at locations of the virtual source/receiver level. Integral Equation (18) may be approximated by a matrix equation that can be numerically solved for $\sum_{j=1}^{N_s} V_z^{dn}(\vec{x}, z, \omega \mid \vec{x}_{sj}, z_{sj})$ to obtain the downgoing vertical acceleration wavefield for coordinate locations in the virtual source/receiver level. Other techniques for generating the downgoing vertical velocity wavefield are described in U.S. patent application Ser. No. 16/577,182, filed Sep. 20, 2019, which is herein incorporated by reference.

The downgoing vertical velocity wavefield is transformed from the space-frequency domain to the space-time domain using an inverse FFT or an inverse DFT as follows:

$$\sum_{j=1}^{N_s} V_z^{dn}(\vec{x}, z, \omega \mid \vec{x}_{sj}, z_{sj}) \to \sum_{j=1}^{N_s} V_z^{dn}(\vec{x}, z, t \mid \vec{x}_{sj}, z_{sj})$$

The time derivative of the downgoing vertical velocity wavefield gives the downgoing vertical acceleration wavefield:

$$\sum_{j=1}^{N_s} A_z^{dn}(\vec{x}, z, t \mid \vec{x}_{sj}, z_{sj}) = \frac{d}{dt} \sum_{j=1}^{N_s} V_{z,Inc}(\vec{x}, z, t \mid \vec{x}_{sj}, z_{sj}) \quad (19)$$

The time derivative of the downgoing vertical velocity wavefield may be approximated using a finite differencing technique, such as the central finite difference given by:

$$\frac{d}{dt} \sum_{j=1}^{N_s} V_{z,Inc}(\vec{x}, z, t \mid \vec{x}_{sj}, z_{sj}) \approx \left[ \sum_{j=1}^{N_s} V_{z,Inc}\left(\vec{x}, z, t + \frac{1}{2}h \mid \vec{x}_{sj}, z_{sj}\right) - \sum_{j=1}^{N_s} V_{z,Inc}\left(\vec{x}, z, t - \frac{1}{2}h \mid \vec{x}_{sj}, z_{sj}\right) \right] / (2h)$$

where h is a value greater than zero (e.g., h may be the interval between consecutive sample times of the downgoing vertical velocity wavefield generated by a particle motion sensor).

The downgoing vertical acceleration wavefield in Equation (5a) is obtained by transforming the downgoing vertical acceleration wavefield in Equation (18) from the space-time domain to the space-frequency domain using an FFT or a DFT as follows:

$$\sum_{j=1}^{N_s} A_z^{dn}(\vec{x}, z, t \mid \vec{x}_{sj}, z_{sj}) \to \sum_{j=1}^{N_s} A_z^{dn}(\vec{x}, z, \omega \mid \vec{x}_{sj}, z_{sj}) \quad (20)$$

Figure 14:
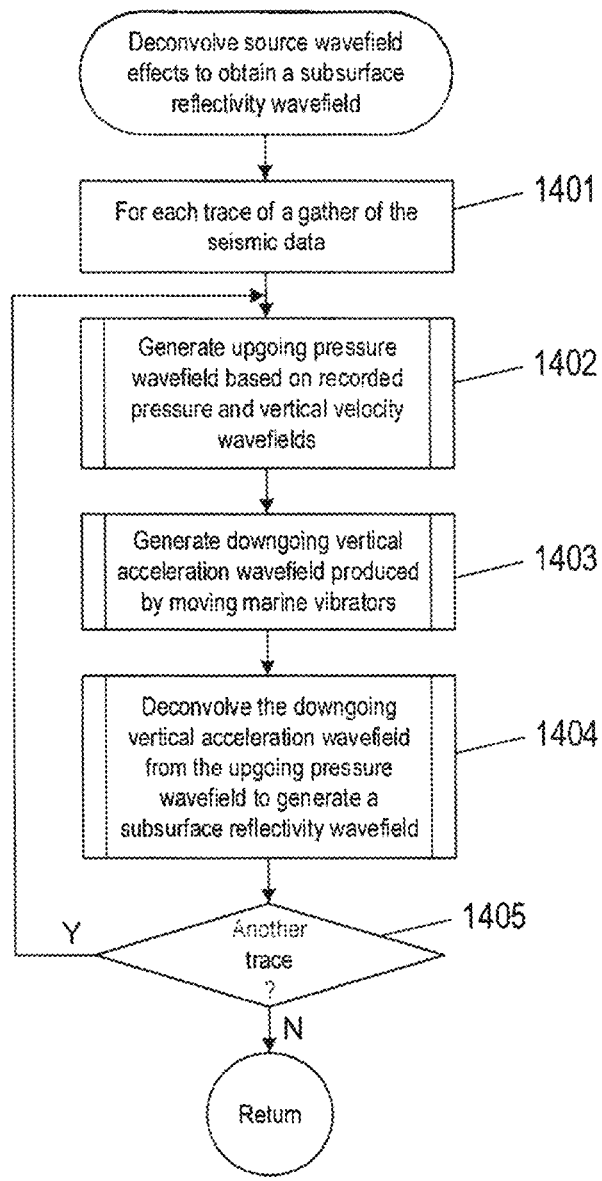
FIG. 14 is a flow diagram illustrating an example implementation of the "deconvolve source wavefield effects to obtain subsurface reflectivity" procedure of FIG. 7.

Deconvolving Source Wavefield Effects to Obtain a Subsurface Reflectivity Wavefield FIG. 14 is a flow diagram illustrating an example implementation of the "deconvolve source wavefield effects to obtain a subsurface reflectivity wavefield" procedure in block 703 of FIG. 7. A loop beginning with block 1401 repeats the operations represented by blocks 1402-1404 for each trace of a gather of recorded seismic data. In block 1402, a "generate upgoing pressure wavefield based on recorded pressure and vertical velocity wavefields" procedure is performed using pressure and vertical velocity wavefields recorded by collocated pressure and vertical velocity sensors. An example implementation of the "generate upgoing pressure wavefield based on recorded pressure and vertical velocity wavefields" procedure is described below with reference to FIG. 15. In block 1403, a "generate downgoing vertical acceleration wavefield produced by moving marine vibrators" procedure is performed. An example implementation of the "generate downgoing vertical acceleration wavefield produced by moving marine vibrators" procedure is described below with reference to FIG. 16. In block 1404, a "deconvolve the downgoing vertical acceleration wavefield from the upgoing pressure wavefield to generate a subsurface reflectivity wavefield" procedure is performed. An example implementation of the "deconvolve the downgoing vertical acceleration wavefield from the upgoing pressure wavefield to generate a subsurface reflectivity wavefield" procedure is described below with reference to FIG. 17. In decision block 1405, the operations represented by blocks 1402-1404 are repeated for another trace.

Figure 15:
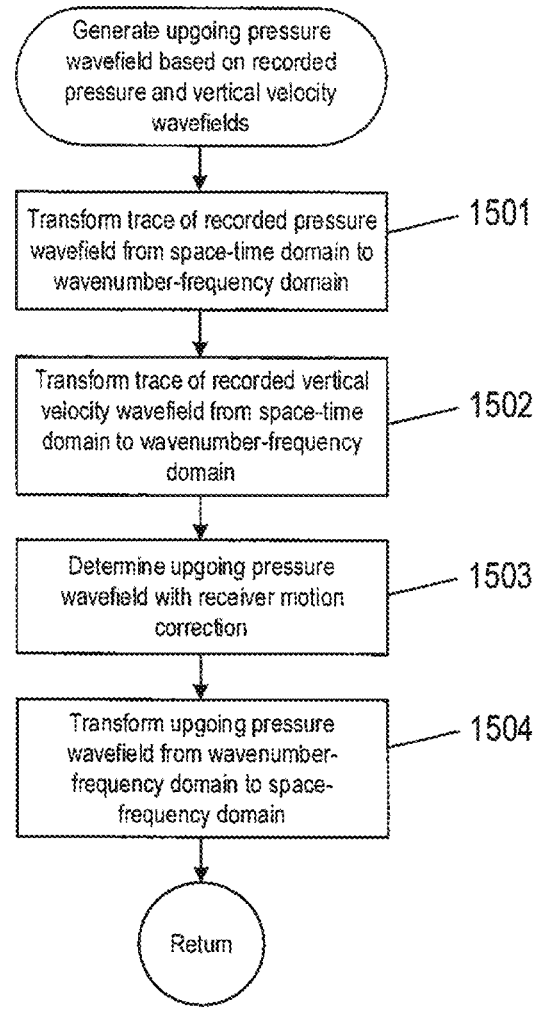
FIG. 15 is a flow diagram illustrating an example implementation of the "generate upgoing pressure wavefield based on recorded pressure and vertical velocity wavefields" procedure of FIG. 14.

FIG. 15 is a flow diagram illustrating an example implementation of the "generate upgoing pressure wavefield based on recorded pressure and vertical velocity wavefields" procedure referenced in block 1402 of FIG. 14. In block 1501, a trace of recorded pressure wavefield is transformed from the space-time domain to the wavenumber-frequency domain as described above with reference to Equation (13). In block 1502, a trace of recorded vertical velocity wavefield is transformed from the space-time domain to the wavenumber-frequency domain as described above with reference to Equation (14). In block 1503, the upgoing pressure wavefield in the wavenumber-frequency domain is computed as described above with reference to Equation (15). In block 1504, the upgoing pressure wavefield is transformed from the wavenumber-frequency domain to the space-frequency domain as described above with reference to Equation (16).

Figure 16:
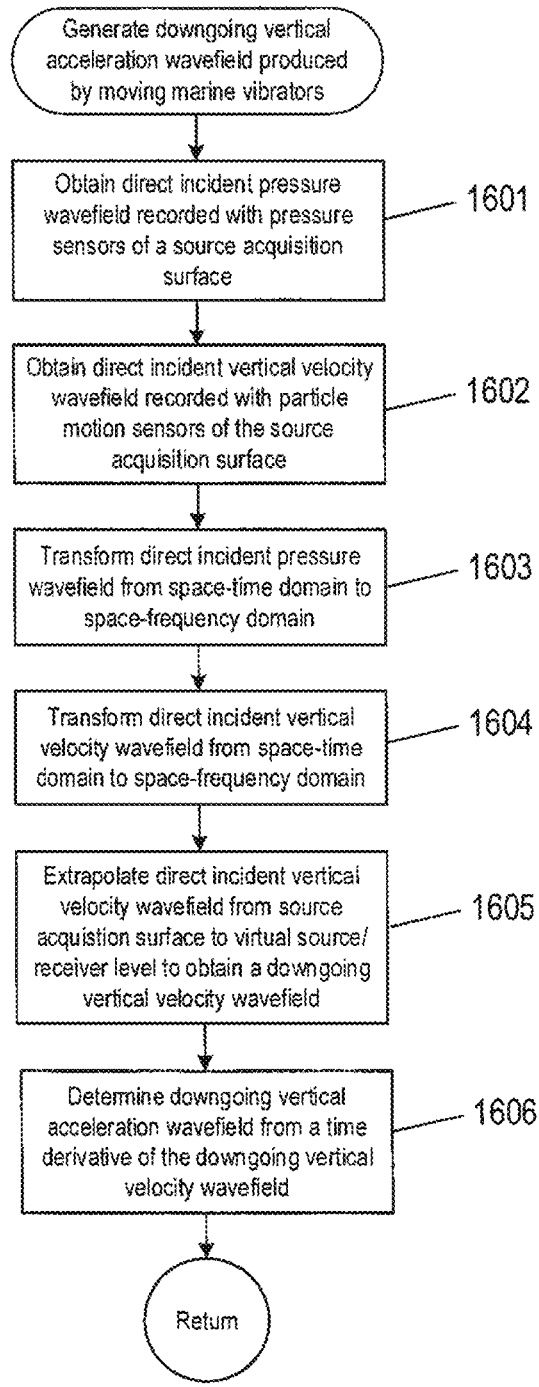
FIG. 16 is a flow diagram illustrating an example implementation of the "generate downgoing vertical acceleration wavefield produced by moving marine vibrators" procedure of FIG. 14.

FIG. 16 is a flow diagram illustrating an example implementation of the "generate downgoing vertical acceleration wavefield produced by moving marine vibrators" procedure referenced in block 1403 of FIG. 14. In block 1601, direct incident pressure wavefield recorded with pressure sensors of a source acquisition surface located within the near field of the marine vibrators are obtained as described above with reference to FIG. 13. In block 1602, direct incident vertical velocity wavefield recorded with particle motion sensors of the source acquisition surface are obtained as described above with reference to FIG. 13. In block 1603, the direct incident pressure wavefield from the space-time domain is transformed to the space-frequency domain. In block 1604, the direct incident vertical velocity wavefield from the space-time domain is transformed to the space-frequency domain. In block 1605, a downgoing vertical velocity wavefield at locations in the virtual source/receiver level is obtained from the direct incident pressure wavefield and the direct incident vertical velocity wavefield as described above with reference to Equation (18). In block 1606, the downgoing vertical acceleration wavefield is obtained from a time derivative of the downgoing vertical velocity wavefield obtained in block 1605.

Figure 17:
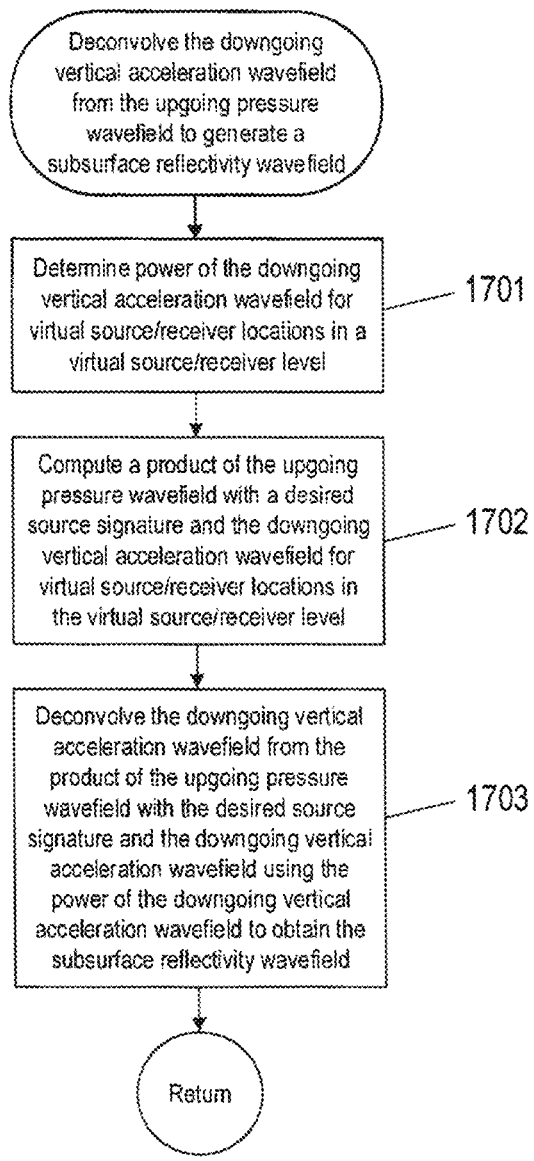
FIG. 17 is a flow diagram of the "deconvolve the downgoing vertical acceleration wavefield from the upgoing pressure wavefield to generate a subsurface reflectivity wavefield" procedure of FIG. 14.

FIG. 17 is a flow diagram of the "deconvolve the downgoing vertical acceleration wavefield from the upgoing pressure wavefield to generate a subsurface reflectivity wavefield" procedure referenced in block 1404 of FIG. 14. In block 1701, power of the downgoing vertical acceleration wavefield generated by the moving marine vibrators of is computed as described above with reference to Equation (10). In block 1702, a product of the upgoing pressure wavefield at the receiver location, a desired source signature, and the downgoing vertical acceleration wavefield for virtual source/receiver locations in the virtual source/receiver level is computed as represented in the numerator of Equation (11). In block 1703, the downgoing vertical acceleration wavefield is deconvolved from the product obtained in block 1702 using the power of the downgoing vertical acceleration wavefield obtained in block 1701 to obtain the subsurface reflectivity wavefield at the receiver location of the trace as represented in Equation (11).

Figure 18:
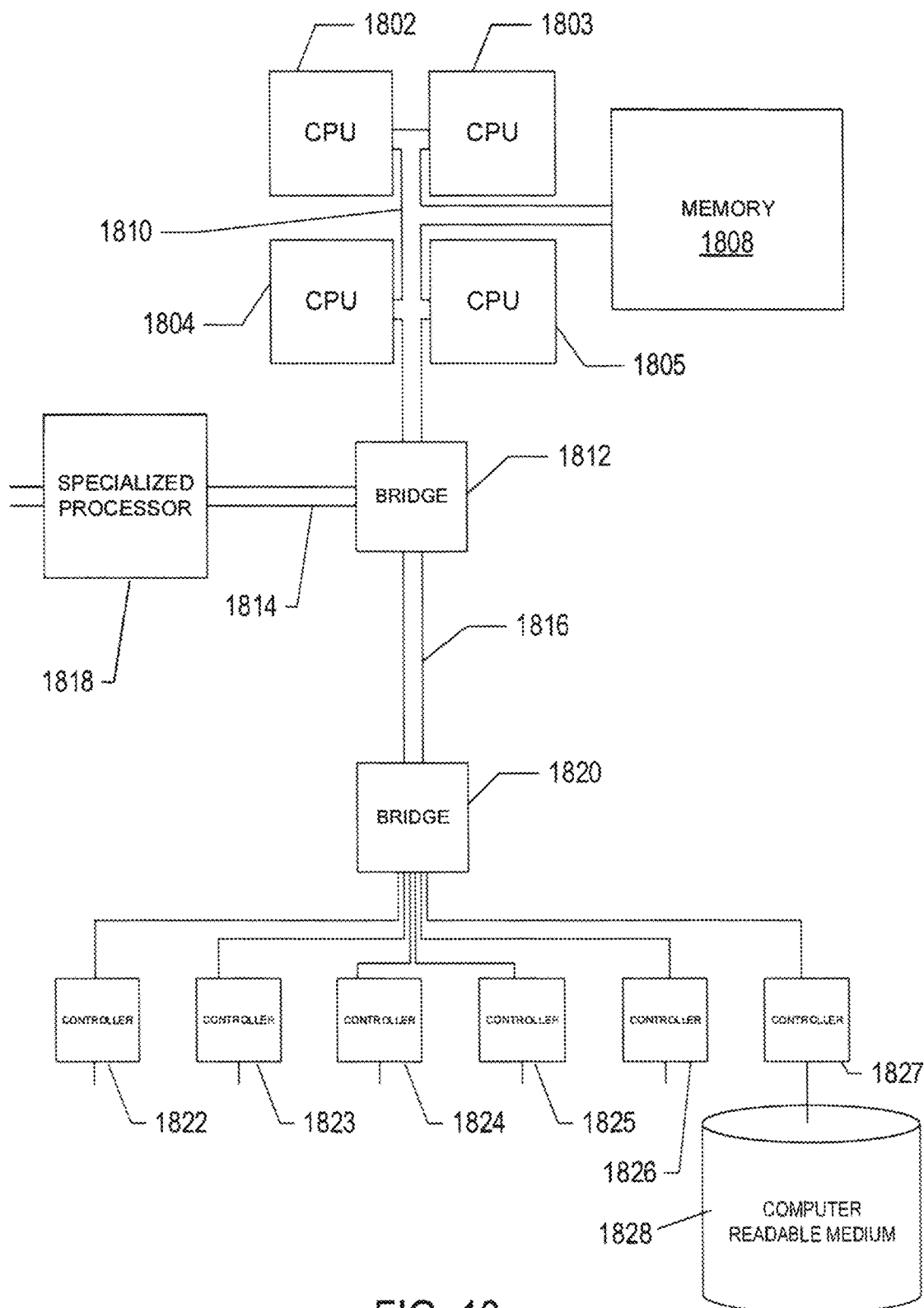
FIG. 18 shows an example computer system that may be used to execute efficient processes described herein and therefore represents a geophysical data-processing system.

FIG. 18 shows an example computer system that may be used to execute an efficient process according to the processes described herein for generating an image of subterranean formation and therefore represents a geophysical-analysis data-processing system. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. The computer system contains one or multiple central processing units ("CPUs") 1802-1805, one or more electronic memories 1808 interconnected with the CPUs by a CPIS memory-subsystem bus 1810 or multiple busses, a first bridge 1812 that interconnects the CPU/memory-subsystem bus 1810 with additional busses 1814 and 1816, or other types of high-speed interconnection media, including multiple, high-speed serial interconnects. The busses or serial interconnections, in turn, connect the CPUs and memory with specialized processors, such as a graphics processor 1818, and with one or more additional bridges 1820, which are interconnected with high-speed serial links or with multiple controllers 1822-1827, such as controller 1827, that provide access to various different types of computer-readable media, such as computer-readable medium 1828, electronic displays, input devices, and other such components, subcomponents, and computational resources. The electronic displays, including a visual display, display screen, monitors, projectors, audio speakers, and other output interfaces, and the input devices, including mice, keyboards, touch screens, and other such input interfaces, together constitute input and output interfaces that allow the computer system to interact with human users. Computer-readable medium 1828 is a data-storage device, which may include, for example, electronic memory, optical or magnetic disk drive, a magnetic tape drive, USB drive, flash memory and any other such data-storage device or devices. The computer-readable medium 1828 can be used to store machine-readable instructions that encode the computational methods described above. The computer-readable medium 1828 or similar devices can also be used to store geophysical data that results from application of the above methods to recorded seismic signals.

Simulation Results

Figure 19A:
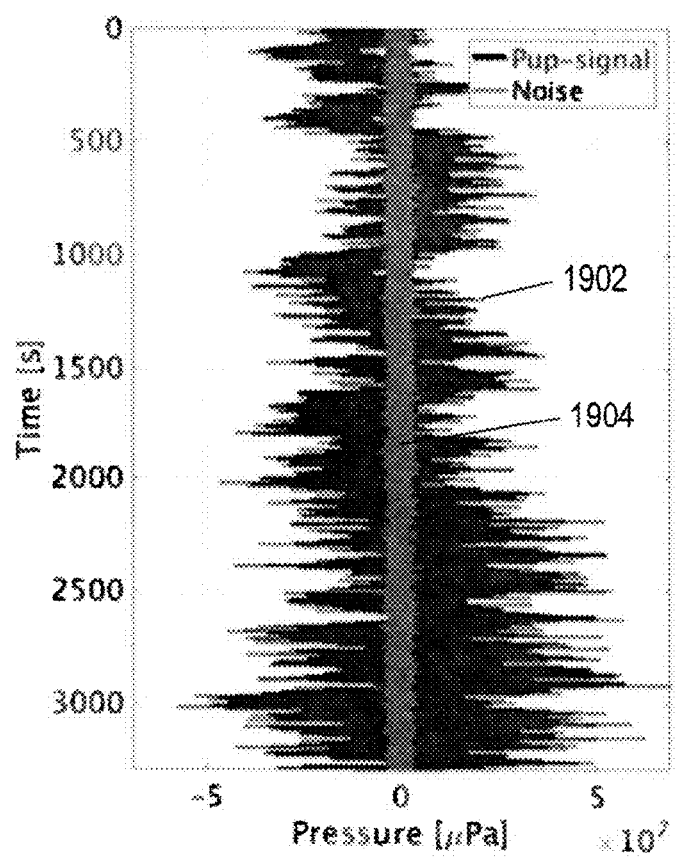
FIGS. 19A-22 show simulation results obtained with continuously generated pseudo-random sweeps.
Figure 19B:
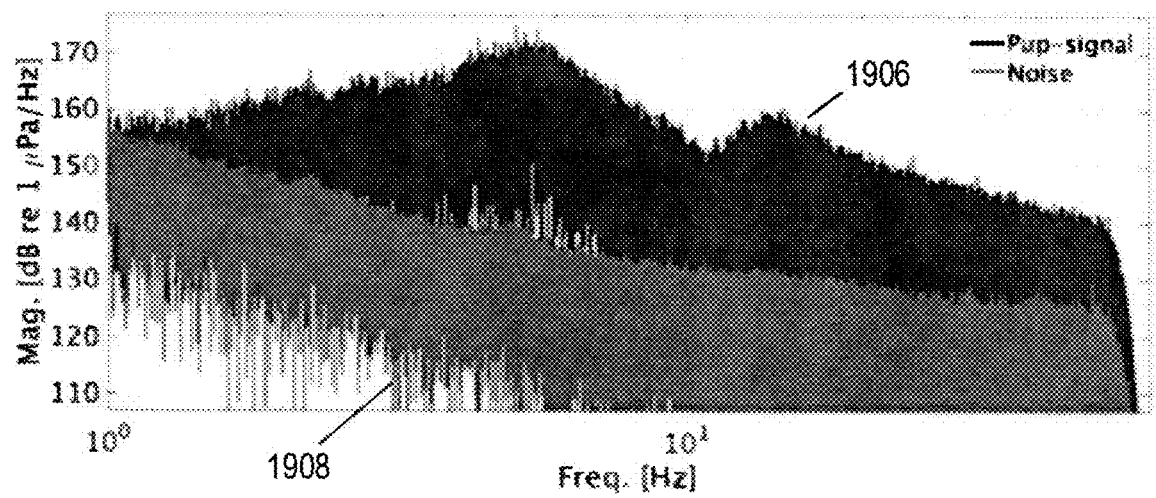
Figure 20:
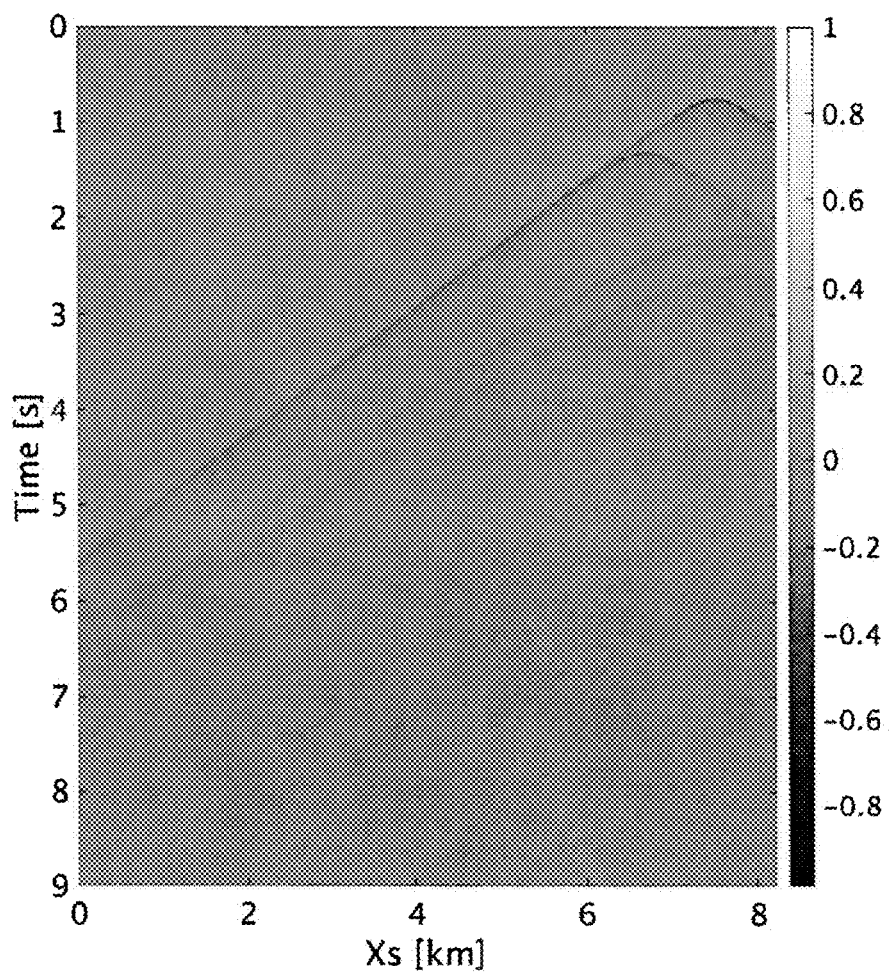
Figure 21:
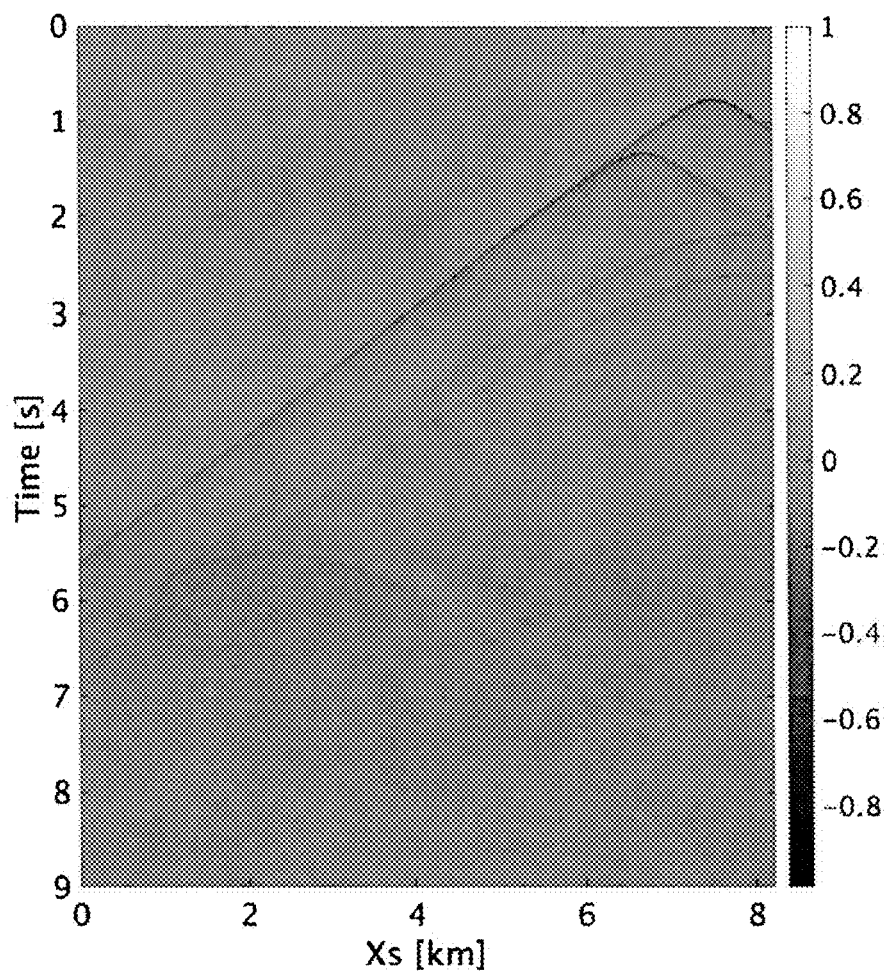
Figure 22:
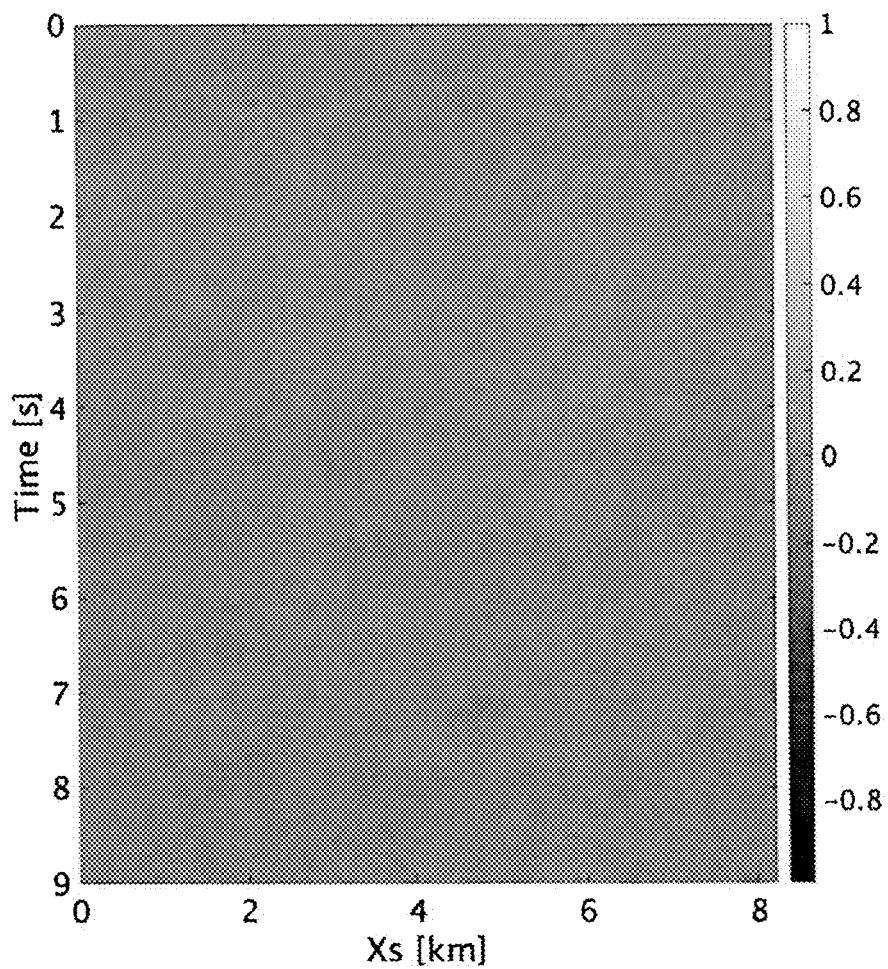

FIGS. 19A-22 show simulation results obtained with continuously generated pseudo-random sweeps for 3300 seconds. Using a random sweep with the signature and amplitude spectra shown in FIGS. 6B and 6C, an upgoing pressure wavefield 1902 was modelled as shown in FIG. 19A with added noise 1904. FIG. 19B shows the amplitude spectrum 1906 of the upgoing pressure wavefield 1902 and amplitude spectrum 1908 of the added noise 1904. Results of source deconvolution performed as described above with reference to Equation (11) are shown in FIGS. 20-22. FIG. 20 shows a gather of seismic data after source deconvolution according to Equation (11). FIG. 21 shows a gather of modelled seismic data that is representative of a true subsurface reflectivity wavefield. FIG. 22 shows the difference between the subsurface reflectivity wavefield in FIG. 21 and the reference data in FIG. 22. Residual error in FIG. 21 is present as random noise that can be removed by simple filtering techniques.

The processes and systems disclosed herein may be used to manufacture a geophysical data product indicative of certain properties of a subterranean formation. A geophysical data product may be manufactured by using the processes and systems described herein to generate geophysical data and storing the geophysical data in a computer-readable medium 1828. The geophysical data may be pressure wavefield, vertical velocity wavefield, upgoing wavefields, subsurface reflections with attenuated source wavefield effects, and any image of a subterranean formation computed using the processes and systems described herein. The geophysical data product may be produced offshore (i.e., by equipment on the survey vessel) or onshore (i.e., at a computing facility on land), or both.

It is appreciated that the previous description of the disclosed embodiments is provided to enable any person skilled in the art to make or use the present disclosure. Various modifications to the embodiments will be apparent to those skilled in the art, and the generic principles defined herein may be applied to other embodiments without departing from the spirit or scope of the disclosure. Thus, the present disclosure is not intended to be limited strictly to the embodiments shown herein but is to be accorded the widest scope consistent with the principles and novel features disclosed herein.

The invention claimed is:

1. In a process for generating an image of a subterranean formation from seismic data recorded in a marine survey of a subterranean formation, the improvement comprising:
    generating an up-going pressure wavefield from a pressure wavefield and a vertical velocity wavefield recorded in the marine survey;
    generating a downgoing vertical acceleration wavefield of random sweeps with orthogonal signatures created by contemporaneously activated marine vibrator passing over the subterranean formation;
    deconvolving the downgoing vertical acceleration wavefield from the up-going pressure wavefield to generate a subsurface reflectivity wavefield; and
    generating an image of the subterranean formation on a display based on the subsurface reflectivity wavefield, thereby increasing resolution of the image with reduced contamination from source wavefield effects.

2. The process of claim 1 wherein generating the up-going pressure wavefield comprises:
    transforming the recorded pressure wavefield from the space-time domain to the wavenumber-frequency domain;
    transforming the recorded vertical velocity wavefield from the space-time domain to the wavenumber-frequency domain;
    generating the upgoing pressure wavefield based on the pressure wavefield and the vertical velocity wavefield in the wavenumber-frequency domain; and
    transforming the upgoing pressure wavefield from the wavenumber-frequency domain to the space-frequency domain.

3. The process of claim 1 wherein deconvolving the downgoing vertical acceleration wavefield data from the up-going pressure wavefield to generate a subsurface reflectivity wavefield comprises:
    determining power of the downgoing vertical acceleration wavefield for locations of a virtual source/receiver level;
    computing a product of the upgoing pressure wavefield data, a desired source signature, and the downgoing vertical acceleration wavefield; and
    deconvolving the downgoing vertical acceleration wavefield from the product using the power of the downgoing vertical acceleration wavefield to obtain the subsurface reflectivity wavefield.

4. The process of claim 1 wherein generating the downgoing vertical acceleration wavefield comprises:
    obtaining a direct incident pressure wavefield recorded with pressure sensors of a source acquisition surface located below the marine vibrators;
    obtaining a direct incident vertical velocity wavefield recorded with particle motion sensors of the source acquisition surface;
    transforming the direct incident pressure wavefield from the space-time domain to the space-frequency domain;
    transforming the direct incident vertical velocity wavefield from the space-time domain to the space-frequency domain;
    generating a downgoing vertical velocity wavefield at locations in a virtual source/receiver level based on the direct incident pressure wavefield and the direct incident vertical velocity wavefield; and
    generating the downgoing vertical acceleration wavefield based on a time derivative of the downgoing vertical velocity wavefield.

5. A system for producing an image of a subterranean formation, the system comprising:
    one or more processors;
    one or more data-storage devices;
    a display; and
    machine-readable instructions stored in the one or more data-storage devices that when executed using the one or more processors controls the system to perform operations comprising:
        generating an up-going pressure wavefield from a pressure wavefield and a vertical velocity wavefield recorded in a marine survey of the subterranean formation;
        generating a downgoing vertical acceleration wavefield of random sweeps with orthogonal signatures created by contemporaneously activated marine vibrator passing over the subterranean formation;
        deconvolving the downgoing vertical acceleration wavefield from the up-going pressure wavefield to generate a subsurface reflectivity wavefield;
        generating an image of the subterranean formation based on the subsurface reflectivity wavefield; and
        displaying the image on the display with reduced contamination from source wavefield effects.

6. The system of claim 5 wherein generating the up-going pressure wavefield comprises:
    transforming the recorded pressure wavefield from the space-time domain to the wavenumber-frequency domain;
    transforming the recorded vertical velocity wavefield from the space-time domain to the wavenumber-frequency domain;
    generating the upgoing pressure wavefield based on the pressure wavefield and the vertical velocity wavefield in the wavenumber-frequency domain; and
    transforming the upgoing pressure wavefield from the wavenumber-frequency domain to the space-frequency domain.

7. The system of claim 5 wherein generating the downgoing vertical acceleration wavefield comprises:
    obtaining a direct incident pressure wavefield recorded with pressure sensors of a source acquisition surface located below the marine vibrators;
    obtaining a direct incident vertical velocity wavefield recorded with particle motion sensors of the source acquisition surface;
    transforming the direct incident pressure wavefield from the space-time domain to the space-frequency domain;
    transforming the direct incident vertical velocity wavefield from the space-time domain to the space-frequency domain;
    generating a downgoing vertical velocity wavefield at locations in a virtual source/receiver level based on the direct incident pressure wavefield and the direct incident vertical velocity wavefield; and
    generating the downgoing vertical acceleration wavefield based on a time derivative of the downgoing vertical velocity wavefield.

8. The system of claim 5 wherein deconvolving the downgoing vertical acceleration wavefield data from the up-going pressure wavefield to generate a subsurface reflectivity wavefield comprises:

determining power of the downgoing vertical acceleration wavefield for locations of a virtual source/receiver level;

computing a product of the upgoing pressure wavefield data, a desired source signature, and the downgoing vertical acceleration wavefield; and deconvolving the downgoing vertical acceleration wavefield from the product using the power of the downgoing vertical acceleration wavefield to obtain the subsurface reflectivity wavefield.

9. A non-transitory computer-readable medium encoded with machine-readable instructions for enabling one or more processors of a computer system to generate an image of a subterranean formation by performing operations comprising:

generating an up-going pressure wavefield from a pressure wavefield and a vertical velocity wavefield recorded in a marine survey of the subterranean formation;

generating a downgoing vertical acceleration wavefield of random sweeps with orthogonal signatures created by contemporaneously activated marine vibrator passing over the subterranean formation;

deconvolving the downgoing vertical acceleration wavefield from the up-going pressure wavefield to generate a subsurface reflectivity wavefield;

generating an image of the subterranean formation based on the subsurface reflectivity wavefield; and displaying the image on a display with reduced contamination from source wavefield effects.

10. The medium of claim 9 wherein generating the up-going pressure wavefield comprises:

transforming the recorded pressure wavefield from the space-time domain to the wavenumber-frequency domain;

transforming the recorded vertical velocity wavefield from the space-time domain to the wavenumber-frequency domain;

generating the upgoing pressure wavefield based on the pressure wavefield and the vertical velocity wavefield in the wavenumber-frequency domain; and transforming the upgoing pressure wavefield from the wavenumber-frequency domain to the space-frequency domain.

11. The medium of claim 9 wherein generating the downgoing vertical acceleration wavefield comprises:

obtaining a direct incident pressure wavefield recorded with pressure sensors of a source acquisition surface located below the marine vibrators;

obtaining a direct incident vertical velocity wavefield recorded with particle motion sensors of the source acquisition surface;

transforming the direct incident pressure wavefield from the space-time domain to the space-frequency domain;

transforming the direct incident vertical velocity wavefield from the space-time domain to the space-frequency domain;

generating a downgoing vertical velocity wavefield at locations in a virtual source/receiver level based on the direct incident pressure wavefield and the direct incident vertical velocity wavefield; and generating the downgoing vertical acceleration wavefield based on a time derivative of the downgoing vertical velocity wavefield.

12. The medium of claim 9 wherein deconvolving the downgoing vertical acceleration wavefield data from the up-going pressure wavefield to generate a subsurface reflectivity wavefield comprises:

determining power of the downgoing vertical acceleration wavefield for locations of a virtual source/receiver level;

computing a product of the upgoing pressure wavefield data, a desired source signature, and the downgoing vertical acceleration wavefield; and deconvolving the downgoing vertical acceleration wavefield from the product using the power of the downgoing vertical acceleration wavefield to obtain the subsurface reflectivity wavefield.

13. Apparatus for generating an image of a subterranean formation from recorded pressure data and recorded vertical velocity data obtained in a marine survey of the subterranean formation using moving marine vibrators, the apparatus comprising:

means for generating an up-going pressure wavefield from a pressure wavefield and a vertical velocity wavefield;

means for generating a downgoing vertical acceleration wavefield of random sweeps with orthogonal signatures created by contemporaneously activated marine vibrator passing over the subterranean formation;

means for deconvolving the downgoing vertical acceleration wavefield from the up-going pressure wavefield to generate a subsurface reflectivity wavefield:

means for generating an image of the subterranean formation based on the subsurface reflectivity wavefield; and mean for displaying the image without contamination from source wavefield effects.

14. The apparatus of claim 13 wherein the means for generating the up-going pressure wavefield comprises:

transforms the recorded pressure wavefield from the space-time domain to the wavenumber-frequency domain;

transforms the recorded vertical velocity wavefield from the space-time domain to the wavenumber-frequency domain;

generates the upgoing pressure wavefield based on the pressure wavefield and the vertical velocity wavefield in the wavenumber-frequency domain; and transforms the upgoing pressure wavefield from the wavenumber-frequency domain to the space-frequency domain.

15. The apparatus of claim 13 wherein the means for generating the downgoing vertical acceleration wavefield comprises:

obtains a direct incident pressure wavefield recorded with pressure sensors of a source acquisition surface located below the marine vibrators;

obtains a direct incident vertical velocity wavefield recorded with particle motion sensors of the source acquisition surface;

transforms the direct incident pressure wavefield from the space-time domain to the space-frequency domain;

transforms the direct incident vertical velocity wavefield from the space-time domain to the space-frequency domain;

generates a downgoing vertical velocity wavefield at locations in a virtual source/receiver level based on the direct incident pressure wavefield and the direct incident vertical velocity wavefield; and generates the downgoing vertical acceleration wavefield based on a time derivative of the downgoing vertical velocity wavefield.

16. The apparatus of claim 13 wherein the means for deconvolving the downgoing vertical acceleration wavefield data from the up-going pressure wavefield to generate a subsurface reflectivity wavefield comprises:
   determines power of the downgoing vertical acceleration wavefield for locations of a virtual source/receiver level;
   computes a product of the upgoing pressure wavefield data, a desired source signature, and the downgoing vertical acceleration wavefield; and
   deconvolves the downgoing vertical acceleration wavefield from the product using the power of the downgoing vertical acceleration wavefield to obtain the subsurface reflectivity wavefield.

17. A method for manufacturing a geophysical data product, the method comprising:
   generating an up-going pressure wavefield from a pressure wavefield and a vertical velocity wavefield recorded in a marine survey of a subterranean formation;
   generating a downgoing vertical acceleration wavefield of random sweeps with orthogonal signatures created by contemporaneously activated marine vibrator passing over the subterranean formation;
   deconvolving the downgoing vertical acceleration wavefield from the up-going pressure wavefield to generate a subsurface reflectivity wavefield; and
   generating an image of the subterranean formation based on the subsurface reflectivity wavefield; and
   storing the image in a computer-readable medium.

* * * * *

UNITED STATES PATENT AND TRADEMARK OFFICE
CERTIFICATE OF CORRECTION

PATENT NO. : 11,709,288 B2
APPLICATION NO. : 16/996050
DATED : July 25, 2023
INVENTOR(S) : Endrias G. Asgedom et al.

It is certified that error appears in the above-identified patent and that said Letters Patent is hereby corrected as shown below:

In the Specification

In Column 1, Line 52 delete "and or" and insert -- and/or --.

In Column 8, Line 49 delete "and or" and insert -- and/or --.

In Column 10, Line 51 delete "and or" and insert -- and/or --.

In Column 11, Line 25 delete "4C," and insert -- 4C. --.

In Column 13, Line 67 delete "viewing," and insert -- viewing. --.

In Column 14, Line 42 delete "$\sum_{j=1}^{N_s} A_z^{dn}(\vec{x}_r, z, \omega | \vec{x}_{sj}, z_{sj})$," and insert the expression -- $\sum_{j=1}^{N_s} A_z^{dn}(\vec{x}, z, \omega | \vec{x}_{sj}, z_{sj})$ --.

In Column 15, Line 50 delete "$r(\vec{x}_r, z_r, \omega | \vec{x}, z)$," and insert -- $R(\vec{x}_r, z_r, \omega | \vec{x}, z)$ --.

In Column 25, Lines 61-62 delete "CPIS memory-subsystem" and insert -- CPU/memory-subsystem --.

Signed and Sealed this
Third Day of September, 2024

Katherine Kelly Vidal
*Director of the United States Patent and Trademark Office*